US012792983B2

(12) United States Patent
Sawula

(10) Patent No.: US 12,792,983 B2
(45) Date of Patent: Nov. 10, 2026

(54) SKILL LEVEL DETERMINATION AND RECOMMENDATIONS FOR DO-IT-YOURSELF (DIY) PROJECTS

(71) Applicant: STATE FARM MUTUAL AUTOMOBILE INSURANCE COMPANY, Bloomington, IL (US)

(72) Inventor: Christopher Sawula, Decatur, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 29 days.

(21) Appl. No.: 18/948,655

(22) Filed: Nov. 15, 2024

(65) Prior Publication Data

US 2026/0094081 A1 Apr. 2, 2026

Related U.S. Application Data

(60) Provisional application No. 63/702,616, filed on Oct. 2, 2024.

(51) Int. Cl.
*G06Q 10/0631* (2023.01)

(52) U.S. Cl.
CPC ............................ *G06Q 10/063112* (2013.01)

(58) Field of Classification Search
CPC .............................................. G06Q 10/063112
See application file for complete search history.

(56) References Cited

U.S. PATENT DOCUMENTS

2007/0239561 A1* 10/2007 Tusing ............... G06Q 30/0633 705/26.81
2016/0189071 A1 6/2016 Scholar
2017/0262815 A1* 9/2017 Shipman ............ G06Q 30/0641
2020/0035112 A1 1/2020 Delaney et al.
2023/0035517 A1* 2/2023 Bentley, III ....... G06Q 30/0206
2024/0338735 A1* 10/2024 Mullins .............. G06Q 10/0635
2025/0130688 A1 4/2025 Wilkowski et al.
2025/0139590 A1* 5/2025 Swartz ............... G06Q 30/0281
2026/0094196 A1* 4/2026 Sawula ............. G06Q 30/0631

OTHER PUBLICATIONS

Sabab et al., "An automated approach to assessing an application tutorial's difficulty", 2020 IEEE Symposium on Visual Languages and Human-Centric Computing (VL/HCC), (2020).

* cited by examiner

*Primary Examiner* — Dylan C White
(74) *Attorney, Agent, or Firm* — MARSHALL, GERSTEIN & BORUN LLP; William J. Samore

(57) ABSTRACT

The present disclosure generally relates to determining a do-it-yourself (DIY) skill level, and/or determining if home improvement projects should be completed via a DIY technique or via hiring a professional. In some embodiments, one or more processors: receive answers to a set of questions; determine a DIY score based upon the answers; receive a home improvement project for the home and a difficulty score of the home improvement project; determine, based upon the DIY score and the difficulty score of the home improvement project, a recommendation to complete the home improvement project via a DIY technique; and/or cause a display to display the recommendation to complete the home improvement project via the DIY technique.

14 Claims, 12 Drawing Sheets

SKILL LEVEL DETERMINATION AND RECOMMENDATIONS FOR DO-IT-YOURSELF (DIY) PROJECTS

CROSS REFERENCE TO RELATED APPLICATIONS

This application claims the benefit of U.S. Provisional Application No. 63/702,616, entitled "Skill Level Determination and Recommendations For Do-It-Yourself (DIY) Projects" (filed Oct. 2, 2024), the entirety of which is incorporated by reference herein.

FIELD

The present disclosure generally relates to determining a do-it-yourself (DIY) skill level, and/or determining if home improvement projects should be completed via a DIY technique or via hiring a professional.

BACKGROUND

Homeowners sometimes face the challenge of determining if they should complete a home improvement project themselves, or hire a professional to complete the project. Furthermore, even if a homeowner would like to complete a home improvement project herself, she may not be aware of where to find instructions explaining how to complete the project and/or what tools are necessary for the project. Even if she does find instructions on how to complete the project, the instructions she finds may not be at her skill level.

The systems and methods disclosed herein may provide solutions to these problems and may provide solutions to the ineffectiveness, insecurities, difficulties, inefficiencies, encumbrances, and/or other drawbacks of conventional techniques.

SUMMARY

Broadly speaking, in some embodiments, a user may be given a test to determine a skill level for DIY projects. In the test, the questions may ask what tools and/or projects the user is comfortable with. The test may be administered in any form, such as multiple choice, swipe right/swipe left, etc. Based upon the user's DIY score, recommendations for particular DIY projects may be presented to the user. Additionally or alternatively, the test score may be used to determine a level to explain a DIY project to the user (e.g., via a tutorial). For example, additional steps and/or details may be explained to a user with a low DIY score than a user with a high DIY score.

In one aspect, a computer-implemented method for providing recommendations for improving a home based upon a do-it-yourself (DIY) skill level of a user may be provided. The method may be implemented via one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For instance, in one example, the method may include: (1) receiving, via one or more processors, answers to a set of questions; (2) determining, via the one or more processors, a DIY score based upon the answers; (3) receiving, via the one or more processors, a home improvement project for the home and/or a difficulty score of the home improvement project; (4) determining, via the one or more processors, based upon the DIY score and/or the difficulty score of the home improvement project, a recommendation to complete the home improvement project via a DIY technique; and/or (5) causing, via the one or more processors, a display to display the recommendation to complete the home improvement project via the DIY technique. The method may include additional, fewer, or alternate actions, including those discussed elsewhere herein.

In another aspect, a computer device for providing recommendations for improving a home based upon a do-it-yourself (DIY) skill level of a user may be provided. The computer device may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For example, in one instance, the computer device may include one or more processors configured to: (1) receive answers to a set of questions; (2) determine a DIY score based upon the answers; (3) receive a home improvement project for the home and/or a difficulty score of the home improvement project; (4) determine, based upon the DIY score and/or the difficulty score of the home improvement project, a recommendation to complete the home improvement project via a DIY technique; and/or (5) cause a display to display the recommendation to complete the home improvement project via the DIY technique. The computer device may include additional, less, or alternate functionality, including that discussed elsewhere herein.

In yet another aspect, a computer system for providing recommendations for improving a home based upon a do-it-yourself (DIY) skill level of a user may be provided. The computer system may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components. For instance, in one example, the computer system may include: one or more processors; and/or one or more non-transitory memories coupled to the one or more processors. The one or more non-transitory memories may include computer-executable instructions stored therein that, when executed by the one or more processors, may cause the one or more processors to: (1) receive answers to a set of questions; (2) determine a DIY score based upon the answers; (3) receive a home improvement project for the home and/or a difficulty score of the home improvement project; (4) determine, based upon the DIY score and/or the difficulty score of the home improvement project, a recommendation to complete the home improvement project via a DIY technique; and/or (5) cause a display to display the recommendation to complete the home improvement project via the DIY technique. The computer system may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The present embodiments relate to, inter alia: (i) determining a do-it-yourself (DIY) skill level of a homeowner, (ii) determining if home improvement projects should be completed via a DIY technique or via hiring a professional, and/or (iii) an improved graphical user interface (GUI) for DIY projects, tutorials, and recommendations.

For context, consider that some applications (apps) for homeowners provide a home score. For example, an insurance company may provide an app to a homeowner that determines a home score for his home. To this end, the insurance company may offer discounts on homeowners insurance based upon the home score. Moreover, the home score may include or be based upon subscores, such as a safety subscore (e.g., safety with regard to fire, weather hazards, crime, etc.), a structural subscore, a plumbing subscore, a heating, ventilation, and air conditioning (HVAC) subscore, etc.

Such an app may provide recommendations to the homeowner for projects that will improve the home score. In one example, the project may be installing an extra smoke detector to increase the home score and/or safety subscore.

However, the recommended project(s) may vary greatly in complexity. Furthermore, different homeowners have different levels of comfortability and/or preferences for completing a project themselves versus hiring a professional to complete the project. For example, some homeowners may prefer (and even enjoy) building a fence around a pool, while others would prefer to hire a professional to build the fence.

Yet, no satisfactory system exists for recommending, to the homeowner, whether to complete the project herself (e.g., via a DIY technique), or to hire a professional to complete the project. As will be seen, the systems and methods described herein advantageously solve this problem.

Further advantageously, certain embodiments provide a GUI to the homeowner in a way that is specifically tailored to her DIY skill level.

In addition, there are other challenges. Particularly, some homeowners are not aware of how to find instructions on how to complete a DIY project. And, even if they are able to find instructions, the instructions may not be at their skill level (e.g., the instructions are too advanced for the homeowner to understand, or more basic than the homeowner would prefer). Advantageously, some embodiments leverage the system's knowledge of a particular homeowner, and further leverage generative artificial intelligence (AI) to provide tutorials specifically at the homeowner's skill level.

Exemplary System

Figure 1:
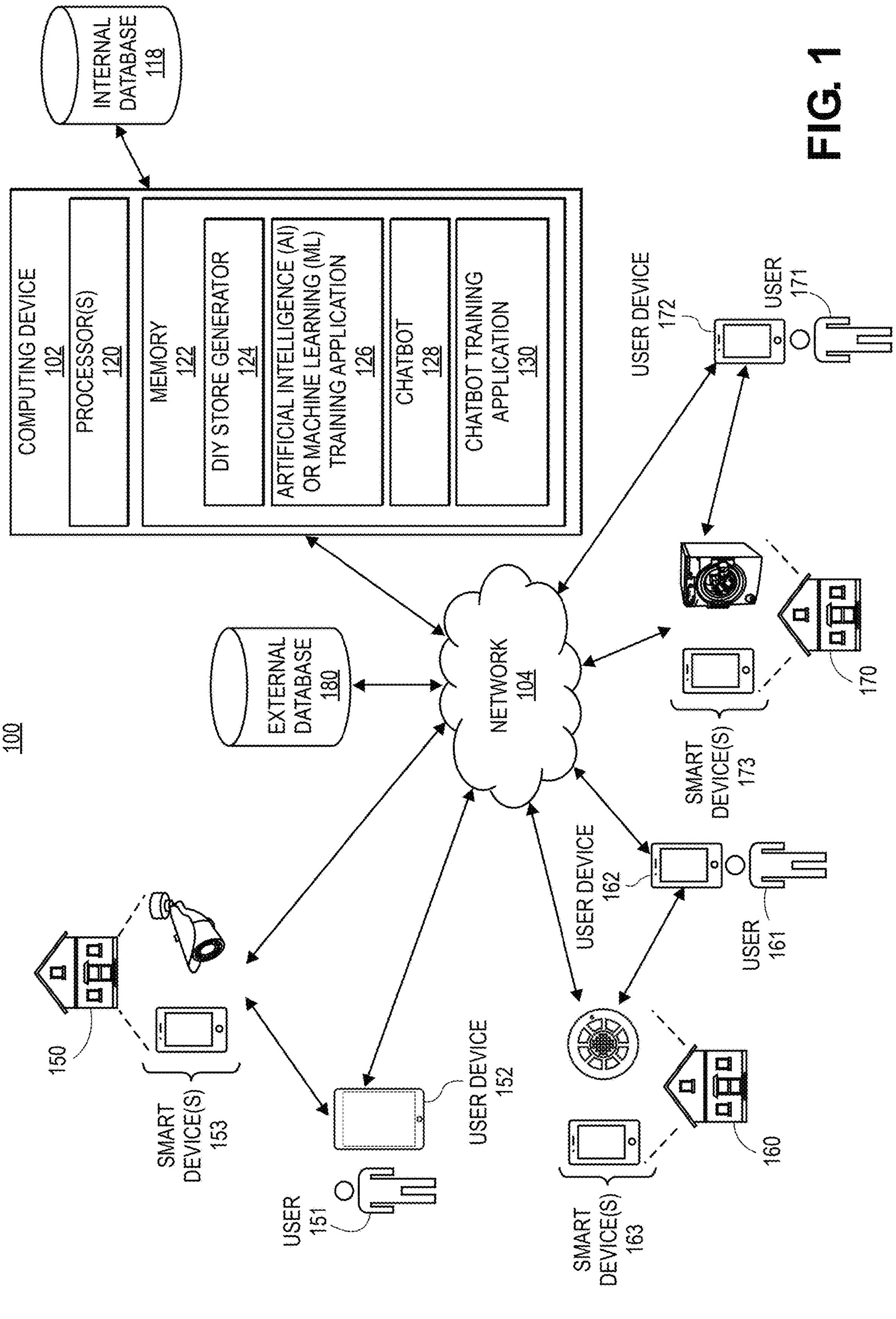
FIG. 1 depicts an exemplary computer system in which methods described herein may be implemented.

FIG. 1 illustrates an exemplary computer system 100 for, inter alia: (i) determining a DIY skill level of a user, (ii) providing recommendations for improving a home based upon the DIY skill level of the user, and/or (iii) improved display of a home improvement project for a home. The exemplary computer-implemented methods described herein may be implemented on the exemplary system 100. The high-level architecture includes both hardware and software applications, as well as various data communications channels for communicating data between the various hardware and software components.

The computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120 (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as DIY score generator 124, artificial intelligence (AI) or machine learning (ML) training application 126, chatbot 128, and/or chatbot training application 130.

In some examples, an insurance company owns the computing device 102, and the insurance company may provide insurance, such as homeowners or renters insurance, to the user 151. As such, in some situations, it may be useful for the insurance company to provide discounts on insurance to reward the user for well maintaining their home 150. To this end, it is useful for the insurance company to generate home score for the home 150. In some embodiments, the home score may be generated, at least in part, from sensor data from the home 150, 160, 170. Such sensor data may come from smart device(s) 153, 163, 173.

To this end, the user 151 may wish to improve her home score. Therefore, the insurance company may advantageously provide an app to the user 151 (for use on the user device 152) which provides recommendations for home improvement projects to improve the user's 151 home score. Furthermore, the app may provide a recommendation on if the user 151 should complete the home improvement project via a DIY technique, or hire a professional to complete the project. To this end, as will be described elsewhere herein, the DIY score generator 124 may determine a DIY score for the user 151. As will further be described elsewhere herein, in some embodiments, the DIY score may be determined, at least in part, via AI and/or ML. In some such embodiments, the AI and/or ML training application 126 may train the DIY score generator 124.

Furthermore, in some embodiments, a tutorial may be provided explaining how to complete the home improvement project via a DIY technique. In some such embodiments, the chatbot 128 advantageously generates or rewrites a tutorial specifically based upon the DIY score, thus specifically tailoring the tutorial to the user's 151 skill level. Additionally or alternatively, the chatbot 128 may converse with the user 151 (e.g., about the DIY technique, etc.) specially at the user's 151 skill level (e.g., converse based upon the DIY score). To this end, the chatbot training application 130 may train the chatbot 128.

Any of the users 151, 161, 171 may use their respective user devices 152, 162, 172 to view the home score(s) (e.g., via a display of the user device 152, 162, 172). The user devices 152, 162, 172 may be any suitable device, such as a computer, a mobile device, a smartphone, a laptop, a phablet, a chatbot or voice bot, etc. The user device 152, 162, 172 may include one or more display devices, one or more processors, one or more memories, etc.

The exemplary system 100 may also include external database 180 and internal database 118. Examples of the data stored by the external database 180 and/or internal database 118 include: historical information used to train AI and/or ML models and/or algorithms, such as historical tutorials, historical descriptions of home improvement projects, historical DIY scores, etc. Further examples of the data stored by the external database 180 and/or internal database 118 include: questions and/or answers thereto (e.g., to determine the DIY score); lists of home improvement projects (and corresponding information, such as difficulty scores of the home improvement projects, etc.); descriptions of home improvement projects; tutorials; etc.

The exemplary system 100 may also include smart devices 153, 163, 173. Examples of the smart devices include: smart security cameras; smart thermostats; smart smoke detectors; smart washing machines; smart dryers; smart dishwashers; smart ovens; smart microwaves; smart sound systems (e.g., including a microphone, etc.); smart water meters; etc.

In addition, further regarding the example system 100, the illustrated exemplary components may be configured to communicate, e.g., via a network 104 (which may be a wired or wireless network, such as the internet), with any other component. Furthermore, although the example system 100 illustrates certain number(s) of each of the components, any number of the example components are contemplated (e.g., any number of users, user devices, homes, smart devices, computing devices, databases, etc.).

Exemplary DIY Score Determination

In some embodiments, as will be explained below, a DIY score (e.g., of any of the users 151, 161, 171) is determined.

Broadly speaking, to calculate the DIY score, a set of questions may be presented (e.g., on any of the user devices 152, 162, 172). The questions may be presented in any suitable format, such as (i) a swipe right swipe left format, (ii) a multiple choice format, and/or (iii) a slider bar format.

Figure 3:
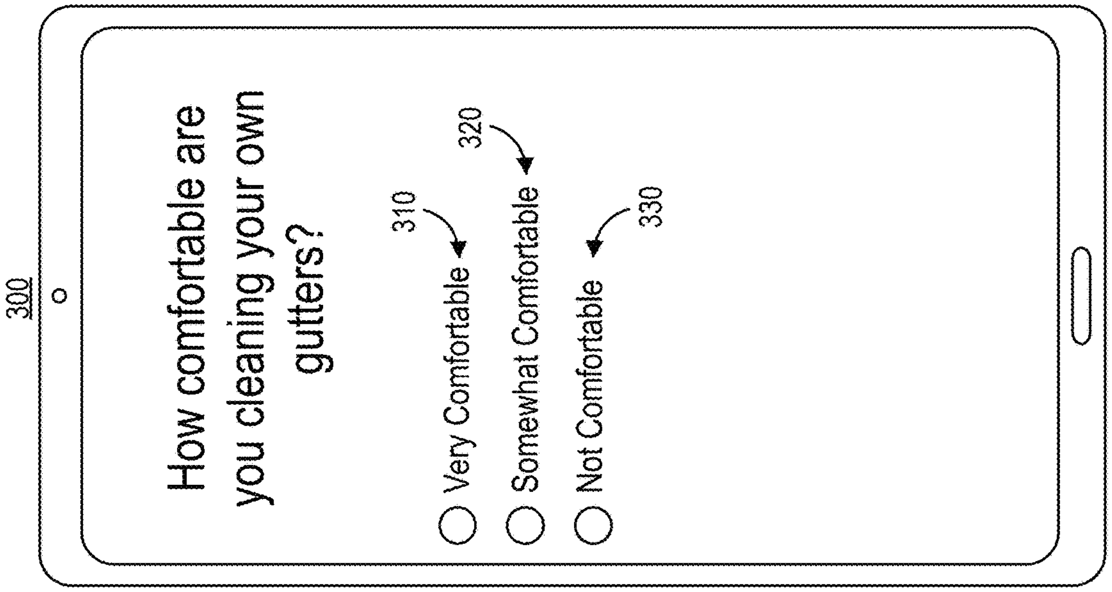
FIG. 3 depicts an exemplary screen including a question in a multiple choice format.
Figure 2:
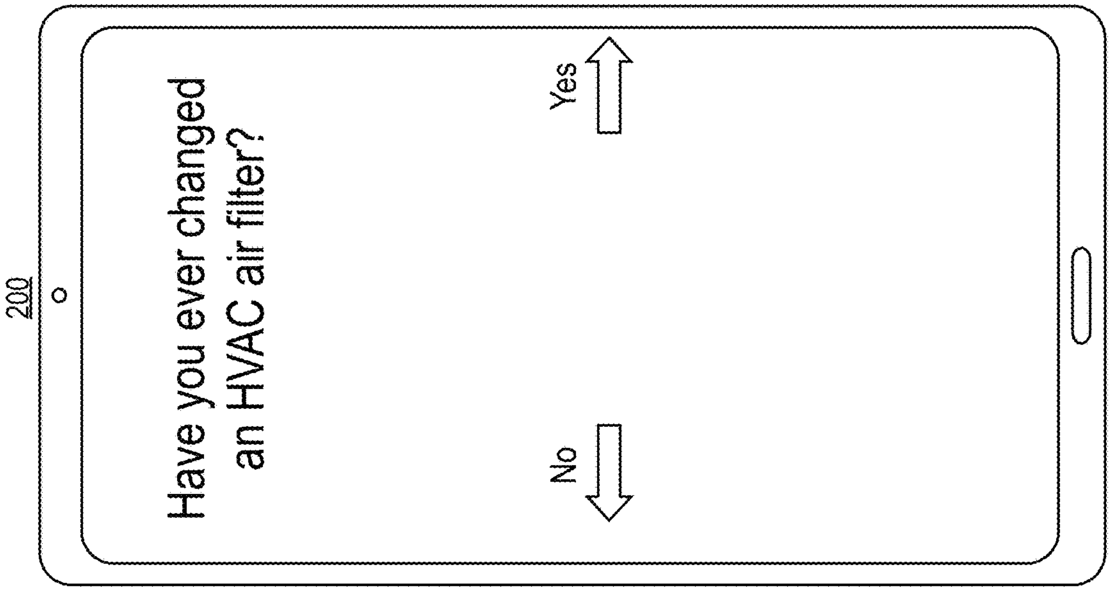
FIG. 2 depicts an exemplary screen including a question in a swipe right swipe left format.
Figure 4:
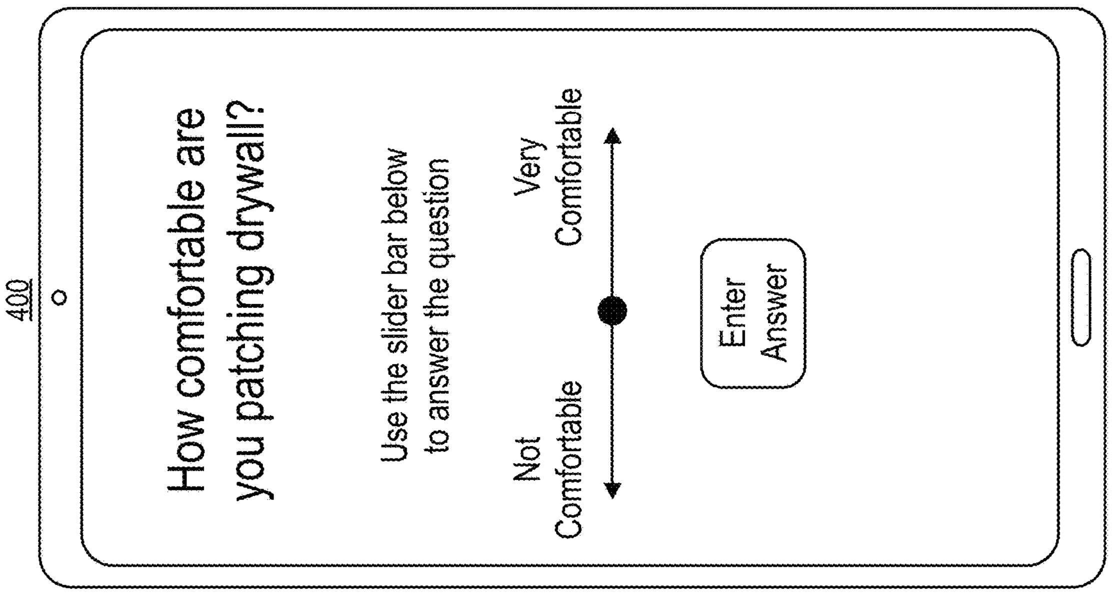
FIG. 4 depicts an exemplary screen including a question in a slider bar format.

To this end, FIG. 2 depicts an exemplary screen 200 including a question in a swipe right swipe left format. FIG. 3 depicts an exemplary screen 300 including a question in a multiple choice format. FIG. 4 depicts an exemplary screen 400 including a question in a slider bar format.

Based upon the answers to the set of questions, the DIY score generator 124 may determine the DIY score and/or an initial DIY score. For instance, a set number of points may be awarded for each answer. For example, if questions are presented in the swipe right swipe left format, a predetermined number of point(s) may be awarded for each answer that the user swipes in a particular direction (e.g., swipes right, as in the example of FIG. 2). In another example, in a multiple choice format, a predetermined number of point(s) may be awarded for each answer 310, 320, 330. In yet another example, in a slider bar format, a number of points may be awarded based upon the position that the user 151, 161, 171 places the slider bar in.

After the DIY score is calculated, it may be updated. For instance, an additional set of questions may be sent to the user 151, and the answers may be used to update the DIY score. Additionally or alternatively, the score may be updated based upon completion of a task. For example, if the user 151 completes a home improvement project via a DIY technique, the DIY score may be modified (e.g., increased, etc.) by a predetermined amount. In another example, if a user 151 completes a home improvement project via hiring a professional, the DIY score may be modified (e.g., decreased, etc.) by a predetermined amount. An indication that a home improvement project is complete may be received by any suitable technique, such as via the user entering the indication into the user device 152, via automatically generated data from smart device(s) 153, etc.

Additionally or alternatively, AI or ML may be used to calculate the DIY score. For example, the questions and answers may be input into an AI or ML algorithm to determine the DIY score. In some variations, an initial DIY score is calculated based upon the set of questions (e.g., an initial set of questions) without the use of AI or ML, and subsequently an AI or ML algorithm is used to update the score. The training of the AI or ML algorithm will be described elsewhere herein.

Exemplary Home Improvement Projects

The computing device 102 may recommend home improvement projects to a user 151. As mentioned above, the home improvement projects may be recommended to improve a home score and/or subscores of the home score.

Examples of home improvement projects include: changing an HVAC air filter; cleaning gutters; patching drywall; installing fencing around a pool or yard; installing outside lighting; installing a security system; installing a cabinet; installing shelving; installing a smart thermostat; installing a smart smoke detector; installing a carbon monoxide detector; installing a sump pump; building a deck; building an ice rink; painting a room; etc.

Furthermore, the computing device 102 may also recommend that a home improvement project be completed via a DIY technique or via hiring a professional. For example, the home improvement project may have a difficulty score, and the recommendation may be based upon both the DIY score and the difficulty score of the home improvement project. For instance, the DIY score may be compared to the difficulty score of the home improvement project to determine the recommendation. For example, if the DIY score is greater than or equal to the difficulty score of the home improvement project, the recommendation may be to complete the home improvement project via a DIY technique.

Figure 5:
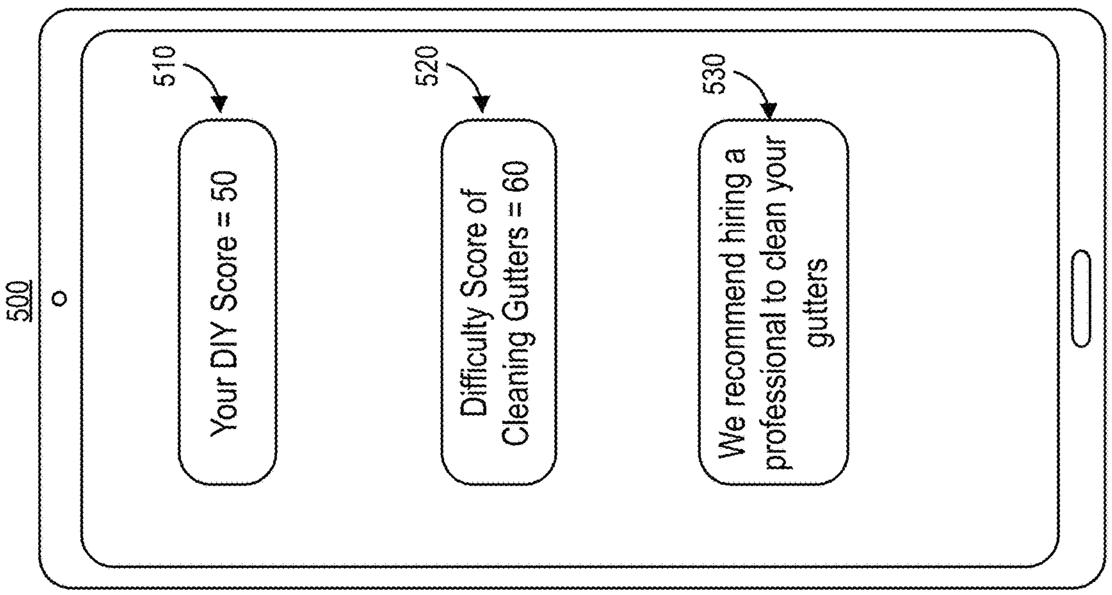
FIG. 5 depicts an exemplary screen including a recommendation to hire a professional.

FIG. 5 depicts an example screen 500 including DIY score 510, difficulty score of the home improvement project 520 and recommendation 530.

Additionally or alternatively, the computing device 102 may recommend a tool to complete the recommended home improvement project. The recommendation may be based upon the home improvement project (e.g., the home improvement project has a list of associated tools, etc.) and/or based upon the DIY score. For instance, a tool may be selected from a list of tools associated with the home improvement project based upon the DIY score (e.g., a more advanced tool is selected if the DIY score is higher). Furthermore, the user 151 may select to see options for purchase of the recommended tool, and/or purchase recommended tools through the app.

Figure 6:
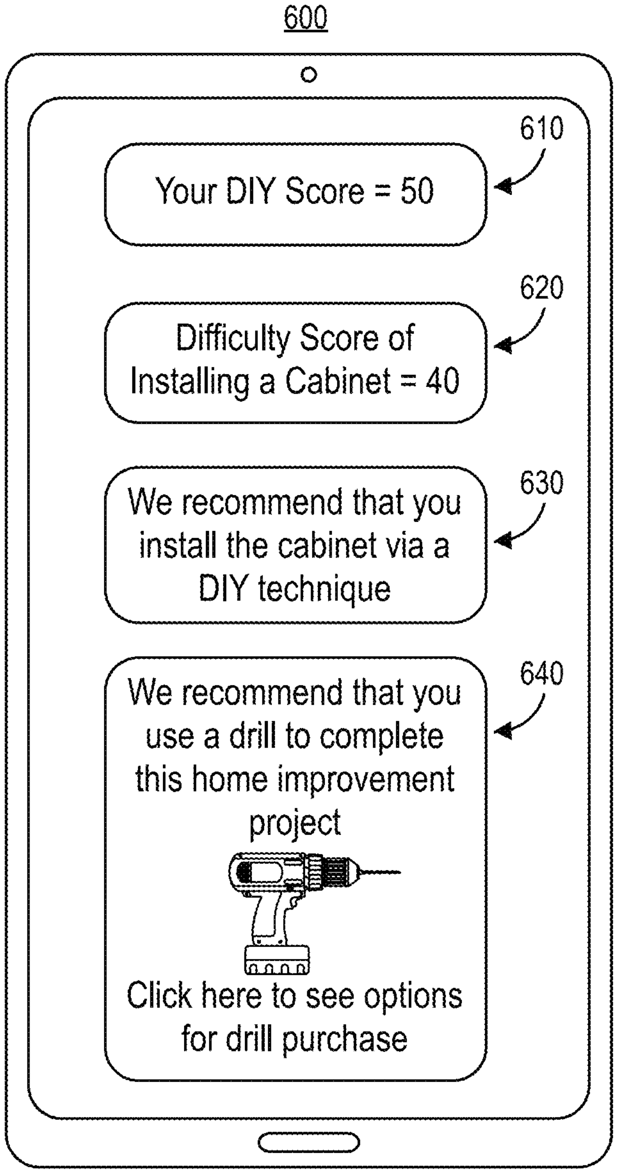
FIG. 6 depicts an exemplary screen including a tool recommendation.

Such an example is illustrated by FIG. 6, which depicts, on exemplary screen 600, DIY score 610, difficulty score 620, recommendation 630, and tool recommendation and button to see options for recommended tool purchases 640.

Examples of recommended tools may include: a drill; an impact driver; a ladder; a stool; a hammer drill; drill bits; a screwdriver; a hammer; safety glasses; gloves; a flashlight; etc.

Exemplary Display

In some embodiments, recommendations and/or options to both (i) complete the home improvement project via the DIY technique, and (ii) complete the home improvement project via hiring a professional may be displayed. In some such examples, advantageously, on the display, recommendations may be emphasized and/or options may be deemphasized.

Figure 7:
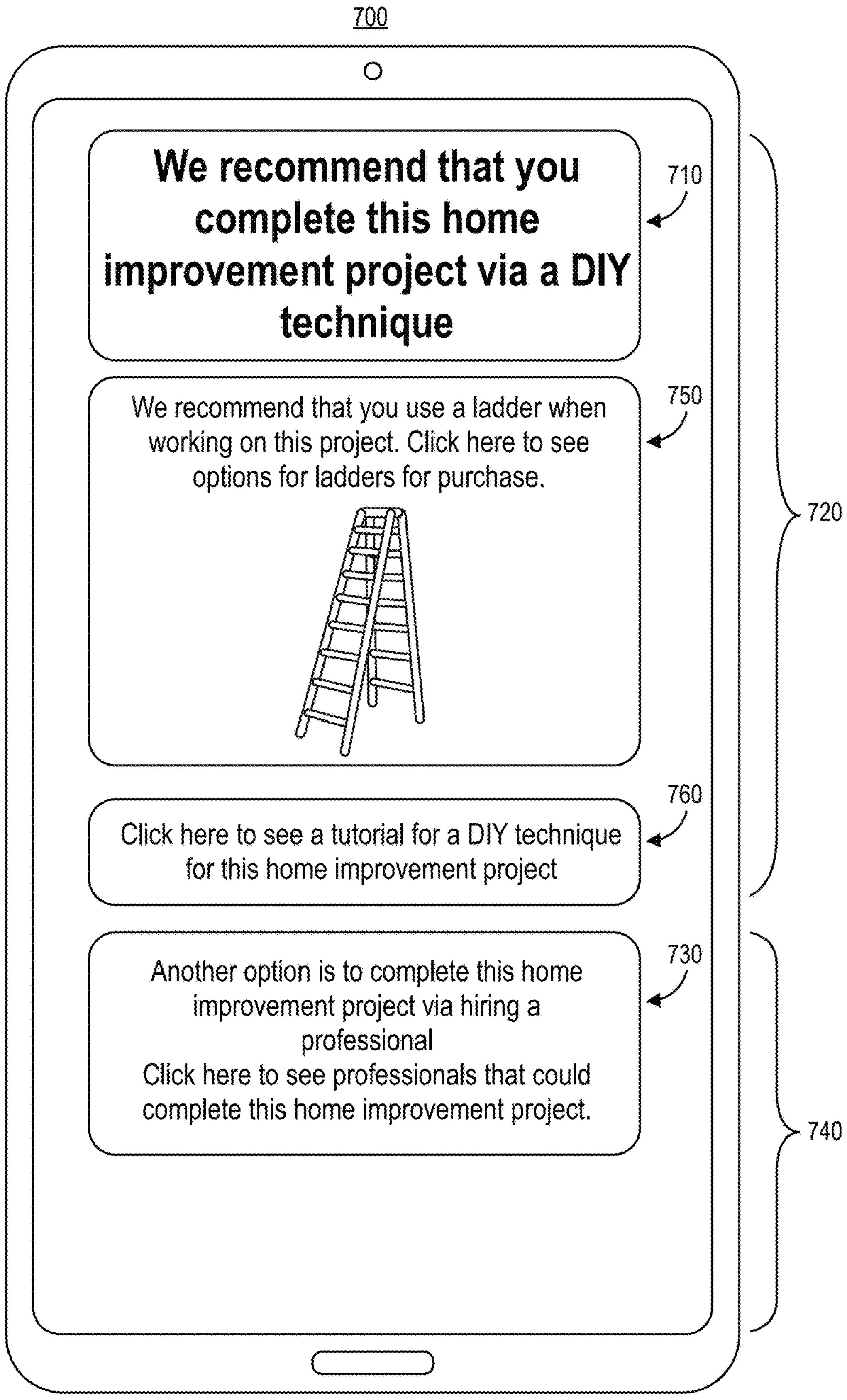
FIG. 7 depicts an exemplary screen including an exemplary recommendation in a first portion of the screen and an exemplary option in a second portion of the screen.

FIG. 7 depicts such an example. Exemplary screen 700 includes recommendation to complete the home improvement project via a DIY technique in first portion 720 (e.g., an upper portion). Exemplary screen 700 further includes option to complete the home improvement project via a hiring a professional 730 in a second portion 740 (e.g., a lower portion). Additionally or alternatively, the text to recommendations and options may be presented in different styles. For instance, in the example of FIG. 7, the recommendation 710 is displayed in boldface, and the option 730 is displayed without boldface.

Additionally or alternatively, tools to recommend 750 (and/or an option to see and/or purchase the recommended tools) may be displayed in the first portion 720 of the display (e.g., for emphasis when a DIY technique is recommended, etc.).

Additionally or alternatively, a button 760 to access a tutorial explaining how to complete a home improvement project may be provided.

Exemplary Tutorials

Figure 8A:
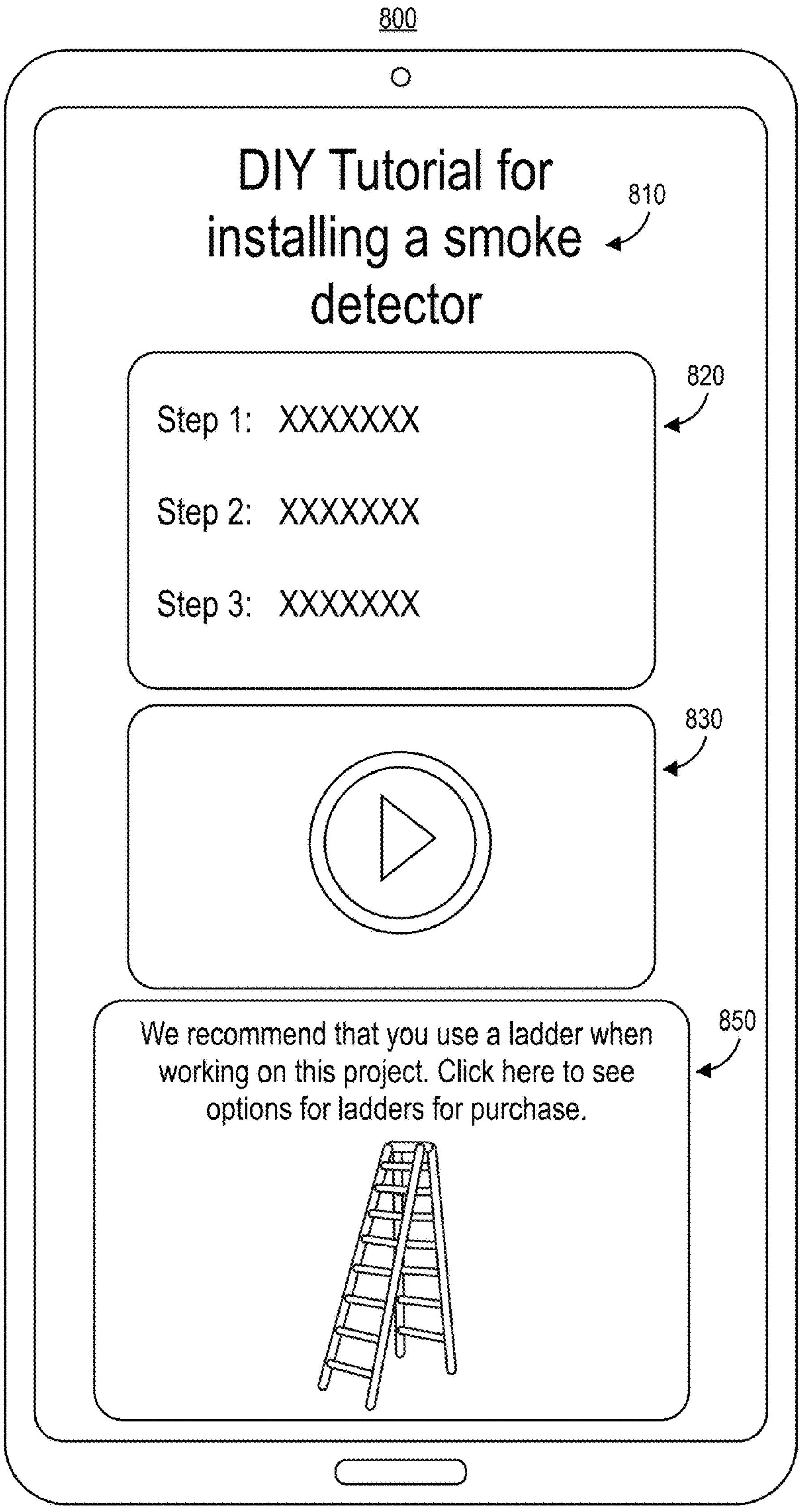
FIG. 8A depicts an exemplary screen including a tutorial explaining how to complete a home improvement project.

To this end, in some examples, a tutorial may be provided to the user 151 explaining how to complete the home improvement project. FIG. 8A depicts exemplary screen 800 including tutorial 810 explaining how to complete home improvement project 820. The exemplary tutorial 810 includes both text 820 and video 830.

Advantageously, the tutorial may be provided and/or tailored to the DIY score. That is, a user with a higher DIY score may be proved with a more sophisticated tutorial; and a user with a lower DIY score may be provided with a more basic tutorial.

Further advantageously, as will be described in further detail elsewhere herein, generative AI may be used to tailor the tutorials based upon the DIY score. For instance, generative AI may write or rewrite a tutorial based upon the DIY score. For example, the generative AI may provide a user with a higher DIY score with a more advanced tutorial; and provide a user with a lower DIY score with a more basic tutorial.

However, some embodiments provide the tutorial without the use of generative AI. For example, a home improvement project may have multiple tutorials with a different expertise score associated with each tutorial. A tutorial may be selected based upon both the expertise score and the DIY score. In this way, for example, users with higher DIY scores may be provided with more sophisticated tutorials, etc.

Exemplary Training of an Exemplary Chatbot

As mentioned above, in some embodiments, generative AI and/or ML is used to write and/or rewire tutorials. This may be implemented via chatbot 128.

In this regard, the chatbot 128 may be capable of understanding requests, providing relevant information, escalating issues, etc. Additionally, the chatbot 128 may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model. In addition, the following discussion applies equally to a voicebot.

The chatbot 128 may be trained by chatbot training application 130 using large training datasets of text which may provide sophisticated capability for natural-language tasks, such as answering questions and/or holding conversations. The chatbot 128 may include a general-purpose pretrained LLM which, when provided with a starting set of words (prompt) as an input, may attempt to provide an output (response) of the most likely set of words that follow from the input. In one aspect, the prompt may be provided to, and/or the response received from, the chatbot 128 and/or any other ML model, via a user interface of the computing device 102 and/or a user interface of the user device 152, 162, 172. This may include a user interface device operably connected via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot 128 to keep track of an entire conversation history as well as the current state of the conversation. The chatbot 128 may rely on various techniques to engage in conversations with users, which may include the use of short-term and long-term memory. Short-term memory may temporarily store information (e.g., in the memory 122 of the computing device 102) that may be required for immediate use and may keep track of the current state of the conversation and/or to understand the user's latest input in order to generate an appropriate response. Long-term memory may include persistent storage of information (e.g., the internal database 118 of the computing device 102) which may be accessed over an extended period of time. The long-term memory may be used by the chatbot 128 to store information about the user (e.g., preferences, chat history, etc.) and may be useful for improving an overall user experience by enabling the chatbot 128 to personalize and/or provide more informed responses.

In some embodiments, the system and methods to generate and/or train an ML chatbot model (e.g., via the chatbot training application 130) which may be used in the chatbot 128, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 9:
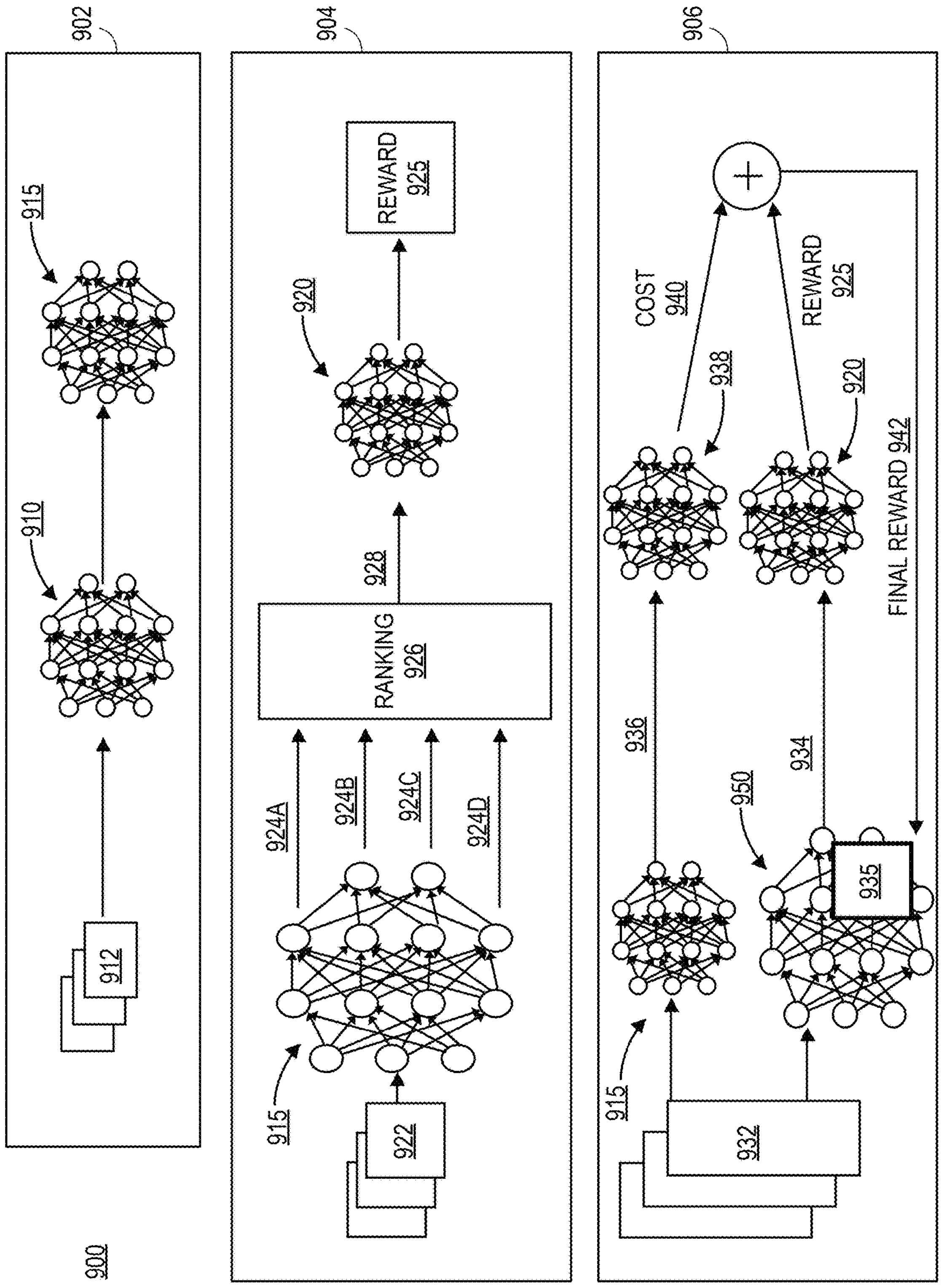
FIG. 9 depicts an exemplary combined block and logic diagram for exemplary training of an exemplary chatbot.

As an initial matter, although the discussion with respect to FIG. 9 refers to ML model 950, it should be understood that 950 may refer equally to an AI and/or ML algorithm and/or model.

FIG. 9 depicts a combined block and logic diagram 900 for training an ML chatbot model, in which the techniques described herein may be implemented, according to some embodiments. It should be understood that FIG. 9 may apply to training any chatbot described herein, and FIG. 9 should not be considered to be restricted to the chatbot 128. In addition, the chatbot 128 may be trained in accordance with any of the other techniques described herein; and the training of chatbot 128 should not be considered restricted to the teachings of FIG. 9.

Some of the blocks in FIG. 9 may represent hardware and/or software components, other blocks may represent data structures or memory storing these data structures, registers, or state variables (e.g., 912), and other blocks may represent output data (e.g., 925). Input and/or output signals may be represented by arrows labeled with corresponding signal names and/or other identifiers. The methods and systems may include one or more blocks 902, 904, 906, which will be described in further detail below.

In one aspect, at block 902, a pretrained language model 910 may be fine-tuned. The pretrained language model 910 may be obtained at block 902 and be stored in a memory, such as memory 122 and/or internal database 118. The pretrained language model 910 may be loaded into an ML training module at block 902 for retraining/fine-tuning. A supervised training dataset 912 may be used to fine-tune the pretrained language model 910 wherein each data input prompt to the pretrained language model 910 may have a known output response for the pretrained language model 910 to learn from. The supervised training dataset 912 may be stored in a memory at block 902, e.g., the memory 122 and/or the internal database 118. In one aspect, the data labelers may create the supervised training dataset 912 prompts and appropriate responses. The pretrained language model 910 may be fine-tuned using the supervised training dataset 912 resulting in the SFT ML model 915 which may provide appropriate responses to user prompts once trained. The trained SFT ML model 915 may be stored in a memory, such as the memory 122 and/or the internal database 118.

In one aspect, the supervised training dataset 912 may include prompts and responses. In some examples, the supervised training dataset 912 may include historical tutorials, historical descriptions of home improvement projects, historical DIY scores, etc. In this way, the chatbot 128 may "learn" how to write or rewrite a tutorial based upon a DIY score. It should be appreciated that the data input into the bot or bots may include text, documents, and imagery data (e.g., images, video, etc.).

Training the Reward Model

In one aspect, training the ML chatbot model 950 may include, at block 904, training a reward model 920 to provide as an output a scaler value/reward 925. The reward model 920 may be required to leverage Reinforcement Learning with Human Feedback (RLHF) in which a model (e.g., ML chatbot model 950) learns to produce outputs which maximize its reward 925, and in doing so may provide responses which are better aligned to user prompts.

Training the reward model 920 may include, at block 904, providing a single prompt 922 to the SFT ML model 915 as an input. However, it should be understood that in some examples, the prompt 922 includes more than one tutorial. The input prompt 922 may be provided via an input device (e.g., a keyboard) of the computing device 102. The prompt 922 may be previously unknown to the SFT ML model 915, e.g., the labelers may generate new prompt data, the prompt 922 may include testing data stored on internal database 118, and/or any other suitable prompt data. The SFT ML model 915 may generate multiple, different output responses 924A, 924B, 924C, 924D (e.g., writes or rewrites of tutorials) to the single prompt 922. At block 904, the computing device 102 may output the responses 924A, 924B, 924C, 924D via any suitable technique, such as outputting via a display (e.g., as text responses), a speaker (e.g., as audio/voice responses), etc., for review and/or rank by the data labelers.

In one example, a data labeler may provide, to the SFT ML model 915, a tutorial, a description of a home improvement project, and/or a DIY score as an input prompt 922. The input may be provided by the labeler (e.g., via the computing device 102, etc.) to the computing device 102 running chatbot 128 utilizing the SFT ML model 915. The SFT ML model 915 may provide, as output responses to the labeler (e.g., via their respective devices), four different writes or rewrites of tutorials 924A, 924B, 924C, 924D. The data labeler may rank 926, via labeling the prompt-response pairs, prompt-response pairs 922/924A, 922/924B, 922/924C, and 922/924D from most preferred to least preferred. The labeler may rank 926 the prompt-response pair data in any suitable manner. The ranked prompt-response pairs 928 may be provided to the reward model 920 to generate the scalar reward 925. It should be appreciated that this facilitates training the chatbot 128 to write and/or rewrite tutorials based upon a DIY score.

The data labelers may provide feedback (e.g., via the computing device 102, etc.) on the responses 924A, 924B, 924C, 924D when ranking 926 them from best to worst based upon the prompt-response pairs. The data labelers may rank 926 the responses 924A, 924B, 924C, 924D by labeling the associated data. The ranked prompt-response pairs 928 may be used to train the reward model 920. In one aspect, the computing device 102 may load the reward model 920 via the chatbot training application 130 and train the reward model 920 using the ranked response pairs 928 as input. The reward model 920 may provide as an output the scalar reward 925.

In one aspect, the scalar reward 925 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 920 may generate a winning reward. Inputting a "losing" prompt-response pair data to the same reward model 920 may generate a losing reward. The reward model 920 and/or scalar reward 936 may be updated based upon labelers ranking 926 additional prompt-response pairs generated in response to additional prompts 922.

While the reward model 920 may provide the scalar reward 925 as an output, the reward model 920 may not generate a response (e.g., text). Rather, the scalar reward 925 may be used by a version of the SFT ML model 915 to generate more accurate responses to prompts, i.e., the SFT model 915 may generate the response such as text to the prompt, and the reward model 920 may receive the response to generate a scalar reward 925 of how well humans perceive it. Reinforcement learning may optimize the SFT model 915 with respect to the reward model 920, which may realize the configured ML chatbot model 950.

RLHF to Train the ML Chatbot Model

In one aspect, the computing device 102 may train the ML chatbot model 950 (e.g., via the chatbot training application 130) to generate a response 934 to a random, new and/or previously unknown user prompt 932. To generate the response 934, the ML chatbot model 950 may use a policy 935 (e.g., algorithm) which it learns during training of the reward model 920, and in doing so may advance from the SFT model 915 to the ML chatbot model 950. The policy 935 may represent a strategy that the ML chatbot model 950 learns to maximize its reward 925. As discussed herein, based upon prompt-response pairs, a human labeler may continuously provide feedback to assist in determining how well the ML chatbot's 950 responses match expected responses to determine rewards 925. The rewards 925 may feed back into the ML chatbot model 950 to evolve the policy 935. Thus, the policy 935 may adjust the parameters of the ML chatbot model 950 based upon the rewards 925 it receives for generating good responses. The policy 935 may update as the ML chatbot model 950 provides responses 934 to additional prompts 932.

In one aspect, the response 934 of the ML chatbot model 950 using the policy 935 based upon the reward 925 may be compared using a cost function 938 to the SFT ML model 915 (which may not use a policy) response 936 of the same prompt 932. The server 906 may compute a cost 940 based upon the cost function 938 of the responses 934, 936. The cost 940 may reduce the distance between the responses 934, 936, i.e., a statistical distance measuring how one probability distribution is different from a second, in one aspect the response 934 of the ML chatbot model 950 versus the response 936 of the SFT model 915. Using the cost 940 to reduce the distance between the responses 934, 936 may avoid a server over-optimizing the reward model 920 and deviating too drastically from the human-intended/preferred response. Without the cost 940, the ML chatbot model 950 optimizations may result in generating responses 934 which are unreasonable but may still result in the reward model 920 outputting a high reward 925.

In one aspect, the responses 934 of the ML chatbot model 950 using the current policy 935 may be passed by the server 906 to the rewards model 920, which may return the scalar reward or discount 925. The ML chatbot model 950 response 934 may be compared via cost function 938 to the SFT ML model 915 response 936 by the server 906 to compute the cost 940. The server 906 may generate a final reward 942 which may include the scalar reward 925 offset and/or restricted by the cost 940. The final reward or discount 942 may be provided by the server 906 to the ML chatbot model 950 and may update the policy 935, which in turn may improve the functionality of the ML chatbot model 950.

To optimize the ML chatbot model 950 over time, RLHF via the human labeler feedback may continue ranking 926 responses of the ML chatbot model 950 versus outputs of earlier/other versions of the SFT ML model 915, i.e., providing positive or negative rewards 925. The RLHF may allow the chatbot training application 130 to continue iteratively updating the reward model 920 and/or the policy 935. As a result, the ML chatbot model 950 may be retrained and/or fine-tuned based upon the human feedback via the RLHF process, and throughout continuing conversations may become increasingly efficient.

Although multiple blocks 902, 904, 906 are depicted in the exemplary block and logic diagram 900, each providing one of the three steps of the overall ML chatbot model 950 training, fewer and/or additional servers may be utilized and/or may provide the one or more steps of the chatbot 128 training. In one aspect, one server may provide the entire ML chatbot model 950 training.

Exemplary AI and/or ML Techniques for Determining a DIY Score

In some embodiments, AI and/or ML algorithm(s) and/or model(s) may be used to partially or wholly determine a DIY score. Although the following discussion refers to an ML algorithm, it should be appreciated that it applies equally to ML and/or AI algorithms and/or models.

Figure 10:
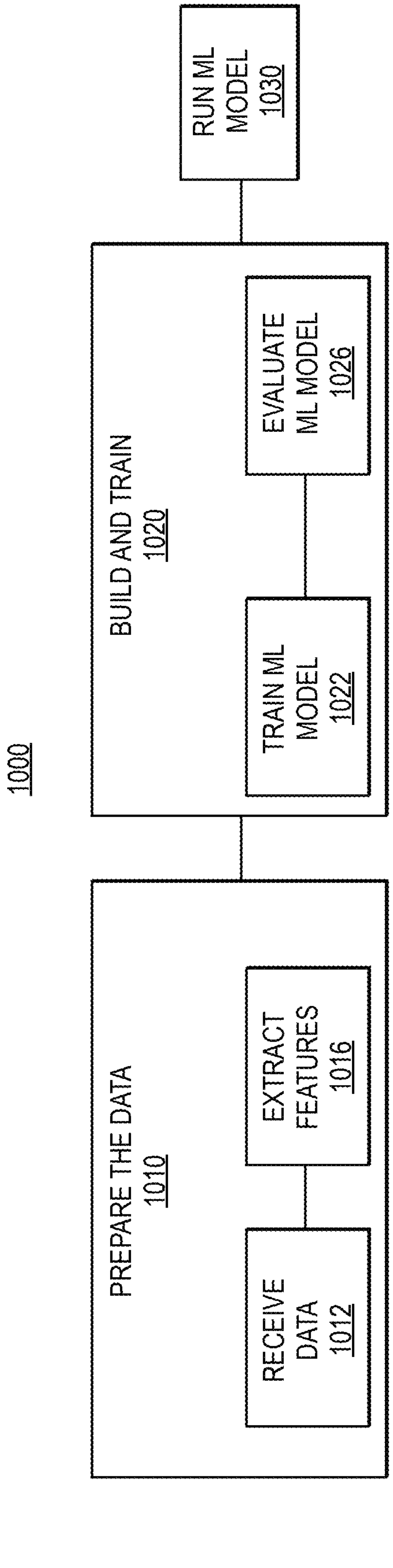
FIG. 10 illustrates a block diagram of an exemplary machine learning modeling method for training and evaluating exemplary machine learning model(s).

FIG. 10 is a block diagram of an exemplary machine learning modeling method 1000 for training and evaluating a ML algorithm (e.g., a DIY determining ML algorithm, etc.), in accordance with various embodiments. In some embodiments, the model "learns" an algorithm capable of performing the desired function, such as determining a DIY score. It should be understood that the principles of FIG. 10 may apply to any machine learning algorithm discussed herein.

Although the following discussion refers to the blocks of FIG. 10 as being performed by the one or more processors 120, it should be appreciated that the blocks of FIG. 10 may be performed by any suitable component or combinations of components (e.g., one or more processors of any of the user devices 152, 162, 172, etc.).

At a high level, the machine learning modeling method 1000 includes a block 1010 to prepare the data, a block 1020 to build and train the model, and a block 1030 to run the model.

Block 1010 may include sub-blocks 1012 and 1016. At block 1012, the one or more processors 120 may receive the historical information to train the machine learning algorithm. In some examples, the historical information comprises: (i) inputs to the machine learning model (e.g., also referred to as independent variables, or explanatory variables), and/or (ii) outputs of the machine learning model (e.g., also referred to as dependent variables, or response variables). In some such examples, the dependent variables are the DIY scores that the ML algorithm is trained to determine; and the independent variables (e.g., historical questions and answers, historical home improvement projects, historical completions of the home improvement projects via a DIY technique or via hiring a professional, etc.) are used to determine the dependent variables. Put another way, the independent variables may have an impact on the dependent variables; and the ML algorithms may be trained to find this impact. Therefore, when using a trained ML algorithm to determine a DIY score, information corresponding to the historical information that the ML was trained on may be routed into the ML algorithm to determine the DIY score. For example, questions and answers, home improvement projects, indications of completions of the home improvement projects via a DIY technique or via hiring a professional, etc., may be input into the trained ML algorithm to determine the DIY score.

More specifically, for the historical information used to train the DIY determining ML algorithm, examples of the independent variables may include historical: historical questions and answers, historical home improvement projects, historical indications of completions of the home improvement projects via a DIY technique or via hiring a professional, etc. An example of the dependent variable is historical DIY scores.

Therefore, when using the DIY determining machine learning algorithm to determine the DIY score, examples of the information routed to the DIY determining machine learning algorithm may include: questions and answers, home improvement projects, indications of completions of the home improvement projects via a DIY technique or via hiring a professional, etc., may be input into the trained ML algorithm to determine the DIY score.

The historical information and/or information of the home may be received from any suitable source. Examples of sources that any of the historical information may be received from include: memory 122, internal database 118, the smart devices 153, 163, 173, etc. It should be appreciated that the historical information and/or information of the home may be received from combinations of these sources as well.

Block 1020 may include sub-blocks 1022 and 1026. At block 1022, the machine learning (ML) model is trained (e.g. based upon the data received from block 1010). In some embodiments where associated information is included in the historical information, the ML model "learns" an algorithm capable of calculating or predicting the target feature values (e.g., determining a DIY score, etc.) given the predictor feature values.

At block 1026, the one or more processors 120 may evaluate the machine learning model, and determine whether or not the machine learning model is ready for deployment.

Further regarding block 1026, evaluating the model sometimes involves testing the model using testing data or validating the model using validation data. Testing/validation data typically includes both predictor feature values and target feature values (e.g., including known inputs and outputs), enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data, such as data including historical information, such as the historical information discussed above), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

Moreover, it should be appreciated the ML algorithm may be any kind of ML algorithm (e.g., neural network, convolutional neural network, deep learning algorithm, etc.).

Figure 11:
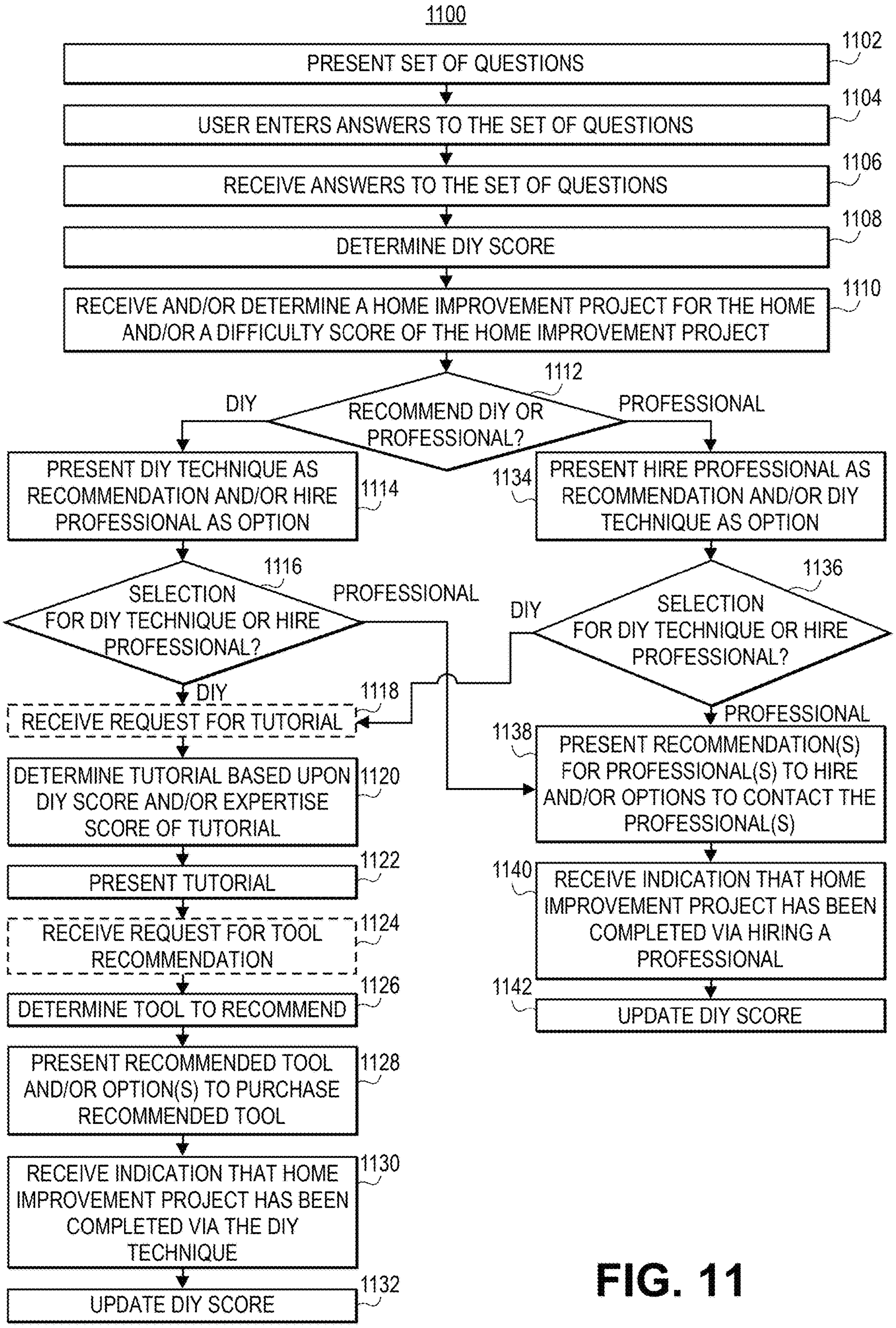
FIG. 11 illustrates a flow diagram representing an exemplary computer-implemented methods for providing recommendations for improving a home based upon a DIY skill level of a user and/or improved display of a home improvement project for a home.

Exemplary Computer-Implemented Methods for Providing Recommendations for Improving a Home Based Upon a DIY Skill Level of a User and/or for Improved Display of a Home Improvement Project for a Home FIG. 11 illustrates a flow diagram representing exemplary computer-implemented methods for providing recommendations for improving a home based upon a DIY skill level of a user and/or for improved display of a home improvement project for a home. The method 1100 may be implemented by a computing environment 100, for example, including computing device 102, the user devices 152, 162, 172, the smart devices 153, 163, 173, and/or any suitable device including those discussed elsewhere herein, such as one or more local or remote processors, transceivers, memory units, sensors, mobile devices, unmanned aerial vehicles (e.g., drones), etc.

Although the following discussion refers to the exemplary method or implementation 1100 as being performed by the one or more processors 120, it should be understood that any or all of the blocks may be alternatively or additionally performed by any other suitable component as well (e.g., one or more processors of the smart devices 153, 163, 173, etc.).

The exemplary method or implementation 1100 may begin at block 1102 when the one or more processors 120 present a set of questions to the user 151. The questions may be presented in any suitable way (e.g., visual and/or auditory, etc.). The questions may be presented to the user 151 via the user device 152. Entry of the answers may also be in any suitable format, such as (i) a swipe right swipe left format (as in the example of FIG. 2), (ii) a multiple choice format (as in the example of FIG. 3), and/or (iii) a slider bar format (as in the example of FIG. 4).

Examples of questions in the set of questions include: a question asking if the user has completed a particular project; a question asking if the user is comfortable performing the particular project; and/or a question asking the user is comfortable using a particular tool.

At block 1104, the user 151 may enter answer(s) to the questions(s). For example, the user 151 may enter answer(s) into a display of the user device 152. Additionally or alternatively, the user 151 may enter answers in auditory form (e.g., via a microphone of the user device 152, which may further be interpreted via a natural language processing (NLP) technique, etc.).

At block 1106, the one or more processors 120 may receive the answers to the set of questions.

At block 1108, the one or more processors 120 may determine the DIY score. The determination of the DIY score is described elsewhere herein. For example, the DIY score may be determined with or without the use of machine learning.

At block 1110, the one or more processors 120 may receive (e.g., from the internal database 118, the external database 180, the user device 152, the smart device 153, etc.) and/or determine a home improvement project. Examples of the home improvement projects are described elsewhere herein.

At block 1112, the one or more processors 120 may recommend to complete the home improvement project via a DIY technique or via hiring a professional. For example, the home improvement project may have an associated difficulty score, and the recommendation may be based upon both the DIY score and the difficulty score of the home improvement project. For instance, the DIY score may be compared to the difficulty score of the home improvement project to determine the recommendation. For example, if the DIY score is greater than or equal to the difficulty score of the home improvement project, the recommendation may be to complete the home improvement project via a DIY technique. In another example, if the DIY score is less than or equal to the difficulty score of the home improvement project, the recommendation may be to complete the home improvement project via hiring a professional.

If the recommendation is to complete the home improvement project via a DIY technique, at block 1114, the one or more processors 120 may present a recommendation to complete the home improvement project via a DIY technique and/or present completing the home improvement project via hiring a professional as an option. Advantageously, in some examples, the recommendation is emphasized over the option. For instance, in the example of FIG. 7, recommendation 710 is displayed in boldface and in a larger font size than option 730. Further advantageously, recommendation 710 may be displayed in a first portion 720 of the display (e.g., an upper portion), and option 730 may be displayed in a second portion 740 of the display (e.g., a lower portion).

At block 1116, the one or more processors 120 may receive a selection for either the DIY technique (e.g., via button 710, etc.) or to hire a professional (e.g., via button 730, etc.).

If the selection is to complete the home improvement project via the DIY technique, the exemplary method or implementation 1100 may proceed to optional block 1118 where a request for a tutorial is received. For example, the user may press button 760. Alternatively, following block 1116, a different screen may be presented asking if user 151 would like to view a tutorial. However, it should be appreciated that block 1118 is optional (e.g., in some embodiments, the tutorial is automatically displayed following a selection of button 710.

At block 1120 a tutorial is determined based upon the DIY score and/or an expertise score of a tutorial. For example, the one or more processors 120 may receive a set of tutorials for the home improvement project with each tutorial in the set having an associated expertise score. A tutorial may then be selected based upon the expertise scores and the DIY score. For example, a tutorial may be selected that has an expertise score that is a closest match to the DIY score.

Additionally or alternatively, the tutorial may be determined by writing the tutorial via generative AI, as described elsewhere herein. For example, the chatbot 128 may receive a description of the home improvement project and the DIY score, and then write the tutorial based upon the description and DIY score. It should be appreciated that in variations where the tutorial includes video, the video may be constructed (e.g., rather than "written").

Additionally or alternatively, the generative AI may rewrite a tutorial. For example, the chatbot 128 may receive a tutorial and the DIY score, and then rewrite the tutorial based upon the DIY score. It should be appreciated that in variations where the tutorial includes video, the video may be reconstructed (e.g., rather than "rewritten").

At block 1122, the determined tutorial may be presented (e.g., as in the example of FIG. 8A, etc.). The tutorial may be presented visually and/or in auditory form.

At optional block 1124, the one or more processors 120 may receive a request for a tool recommendation (e.g., user 151 presses button 850, etc.). However, it should be appreciated that block 1124 is optional (e.g., in some embodiments, the tool recommendation is automatically determined and/or displayed without requiring a selection by the user, etc.).

At block 1126, the one or more processors 120 may determine a tool to recommend. For example, a tool may be selected from a list of tools associated with the home improvement project based upon the DIY score (e.g., a tool is selected based upon a closet match to the DIY score).

Figure 8B:
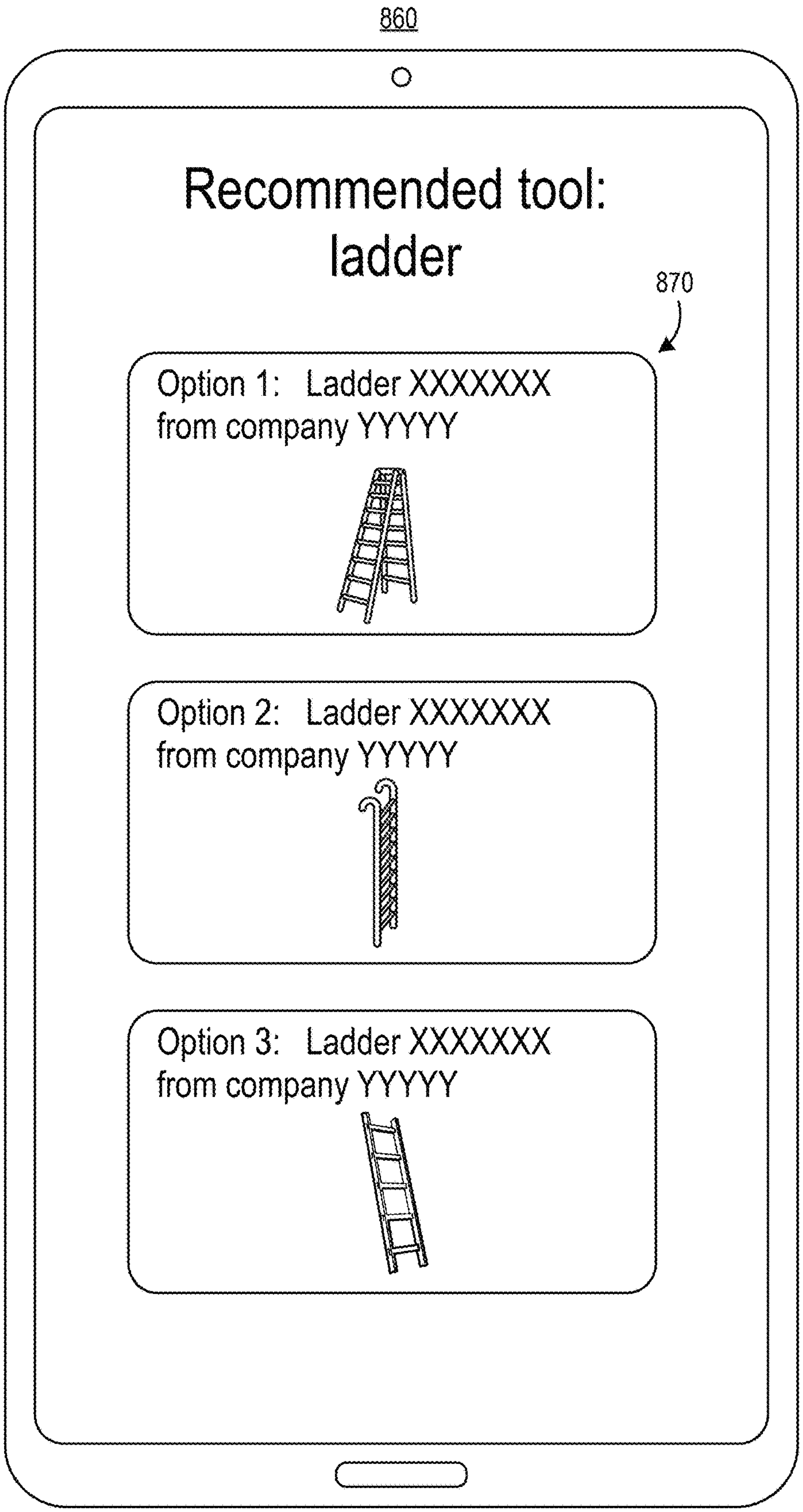
FIG. 8B depicts an exemplary screen including options to purchase a recommended tool for the home improvement project.

At block 1128, the one or more processors 120 may present options for recommended tool(s) (e.g., on a display of the user device 152, in auditory form, etc.). FIG. 8B depicts exemplary screen 860 (e.g., displayed on the user device 152, etc.) including options 870 to purchase a recommended tool, which, in the illustrated example, is a ladder.

Advantageously, for emphasis, in some examples, the recommendation for the tool may be placed in the first portion 720 of the display.

At block 1130, the one or more processors 120 may receive an indication that the home improvement project has been completed via the DIY technique. The indication may be received by any suitable technique, such as via the user entering the indication into the user device 152, via automatically generated data from smart device(s) 153, etc.

At block 1132, the one or more processors 120 may update the DIY score (e.g., based upon the indication that the home improvement project has been completed via the DIY technique). In some examples, the DIY score is further updated based upon the difficulty score of the completed home improvement project (e.g., DIY score increased a greater amount for completing a more difficult home improvement project than for completing a simple project). In some examples, the update is made by inputting an indication of the completion into an AI or ML algorithm, as described elsewhere herein.

Figure 12:
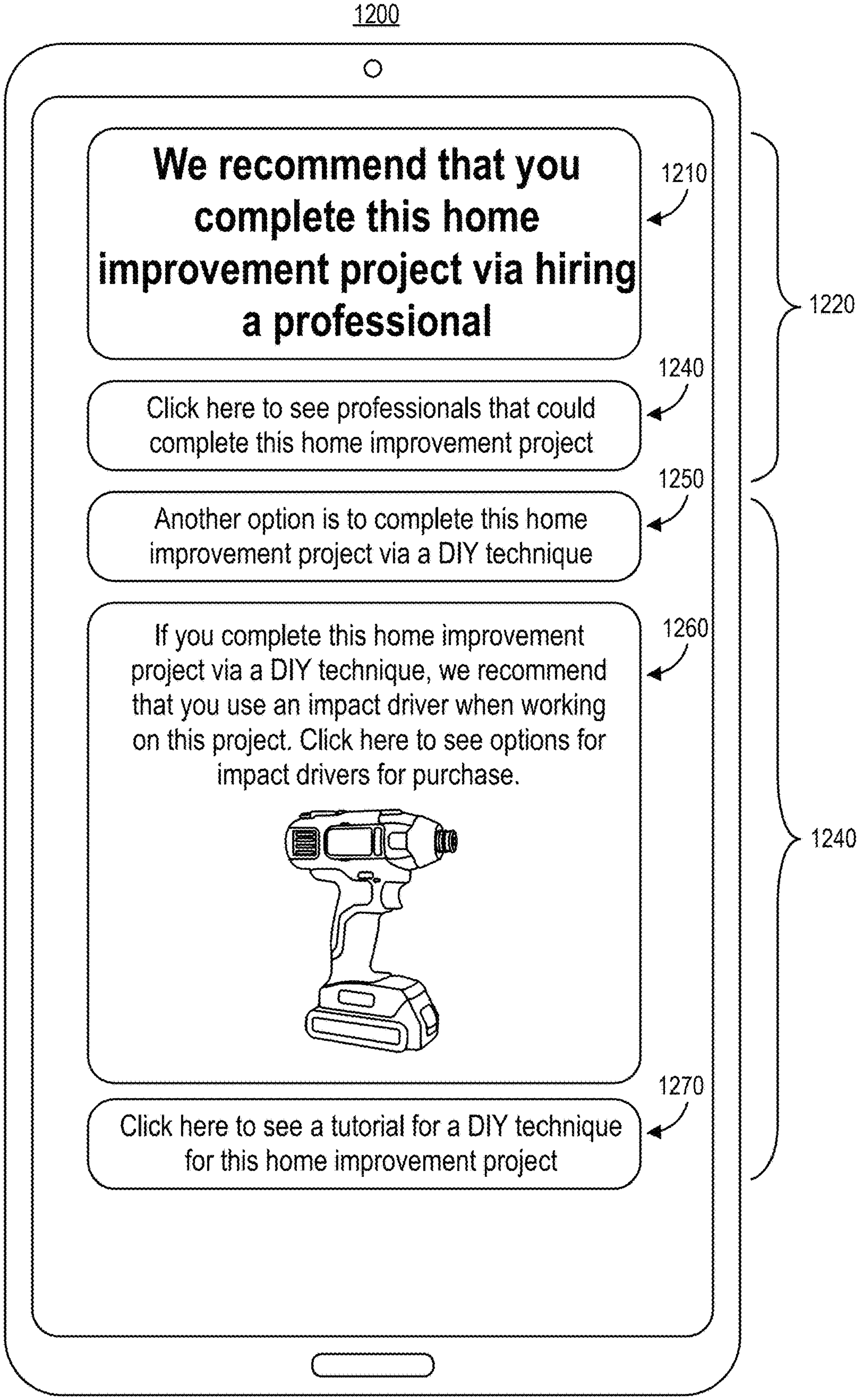
FIG. 12 depicts a further exemplary screen including an exemplary recommendation in a first portion of the screen and an exemplary option in a second portion of the screen.

Returning now to block 1112, if the decision is to recommend a professional, the one or more processors 120 may present a recommendation to complete the home improvement project via hiring a professional and/or present completing the home improvement project via a DIY technique as an option (block 1134). Advantageously, in some examples, the recommendation is emphasized over the option. For instance, in the example of FIG. 12, recommendation 1210 is displayed in boldface and in a larger font size than option 1250. Further advantageously, recommendation 1210 may be displayed in a first portion 1220 of the display (e.g., an upper portion), and option 1250 may be displayed in a second portion 1240 of the display (e.g., a lower portion). Further in the illustrated example, the screen 1200 allows the user 151 to: select to view professionals to complete the home improvement project (e.g., by clicking button 1240); see options for recommended tool(s) for purchase (e.g., via button 1260); and access a tutorial (e.g., via button 1270).

At block 1136, the one or more processors 120 may receive a selection for either the DIY technique (e.g., via button 1250, etc.) or to hire a professional (e.g., via button 1210, etc.).

If the user 151 selects the DIY option, the exemplary computer-implemented method or implementation 1200 proceeds to optional block 1118 and further proceeds as described above.

Figure 13:
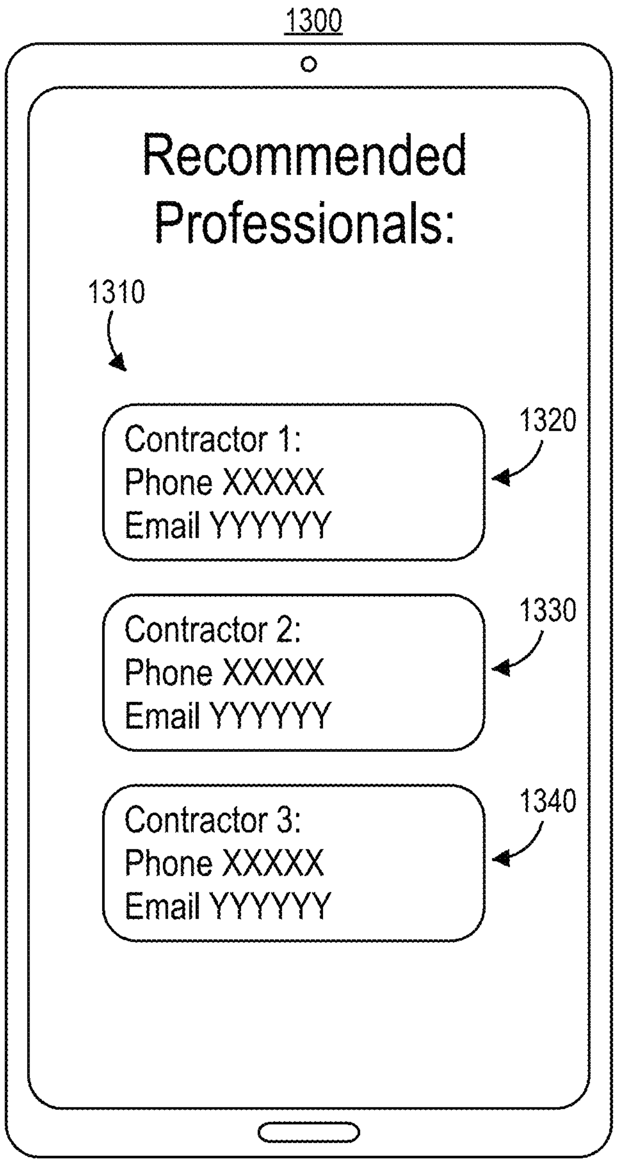
FIG. 13 depicts an example screen including recommendations for professionals to hire.

If the user 151 selects to hire a professional (either at block 1136 or block 1116), the one or more processors 120 present recommendation(s) for professional(s) to hire and/or options to contact the professional(s) (block 1138). FIG. 13 depicts an example screen 1300 including recommendations for professionals to hire 1310. The contact information of any of the recommended professionals (e.g., phone number, email address, etc.) may be listed in, for example, any of the buttons 1320, 1330, 1340. Additionally or alternatively, pressing on any of the buttons 1320, 1330, 1340 may cause a smart phone to initiate a call and/or email to the respective recommended professional.

At block 1140, the one or more processors 120 may receive an indication that the home improvement project has been completed via hiring a professional. The indication may be received by any suitable technique, such as via the user entering the indication into the user device 152, via automatically generated data from smart device(s) 153, via the hired professional sending the indication, etc.

At block 1142, the one or more processors 120 may update the DIY score (e.g., based upon the indication that the home improvement project has been completed via hiring a professional). In some examples, the DIY score is further updated based upon the difficulty score of the completed home improvement project (e.g., DIY score decreased less for hiring a professional to complete a more difficult project than a simple project). In some examples, the update is made by inputting an indication of the completion into an AI or ML algorithm, as described elsewhere herein.

It should be appreciated at any point in the exemplary computer-implemented method or implementation 1100, the: (i) DIY score, (ii) difficulty scores of home improvement projects, and/or (iii) expertise scores of tutorials may be displayed (e.g., on a display of the user device 152, 162, 172).

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments—Improved GUI

In one aspect, a computer-implemented method for improved display of a home improvement project for a home may be provided. The method may be implemented via one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For instance, in one example, the method may include: (1) determining, via one or more processors, a do-it-yourself (DIY) score of a user based upon answers to a set of questions; (2) determining, via the one or more processors, based upon the DIY score and/or a difficulty score of the home improvement project, a recommendation to complete the home improvement project via a DIY technique; and/or (3) in response to determining the recommendation to complete the home improvement project via the DIY technique, displaying, via the one or more processors: (i) the recommendation to complete the home improvement project via the DIY technique in a first portion of a display, wherein the first portion of the display is an upper portion of the display, and/or (ii) an option to complete the home improvement project via a hiring a professional in a second portion of the display, wherein the second portion of the display is a lower portion of the display. The method may include additional, fewer, or alternate actions, including those discussed elsewhere herein.

In some embodiments, the computer-implemented method further includes: determining, via the one or more processors, a tool to recommend based upon: (i) the home improvement project, and/or (ii) the DIY score; and/or displaying, via the one or more processors, the recommendation for the tool in the first portion of the display.

In some embodiments, the computer-implemented method further includes: determining, via the one or more processors, a recommendation for a professional to hire based upon the home improvement project; and/or displaying, via the one or more processors, the recommendation for the professional to hire in the second portion of the display.

In some embodiments, the computer-implemented method further includes: receiving, via the one or more processors, a set of tutorials, wherein each tutorial in the set of tutorials has an associated expertise score; determining, via the one or more processors, a tutorial from the set of tutorials based upon the DIY score and/or the expertise scores; and/or displaying, via the one or more processors, at least part of the determined tutorial.

In some embodiments, the computer-implemented method further includes: receiving, via the one or more processors, a tutorial explaining how to complete the home improvement project via the DIY technique; rewriting, via the one or more processors, the tutorial by inputting, into a generative artificial intelligence (AI) algorithm: (i) the tutorial, and/or (ii) the DIY score; and/or displaying, via the one or more processors, at least part of the rewritten tutorial.

In some embodiments, the home improvement project is a first home improvement project, and/or the computer-implemented method further includes: receiving, via the one or more processors, a second home improvement project for the home and/or a difficulty score of the second home improvement project; determining, via the one or more processors, based upon the DIY score and/or the difficulty score of the second home improvement project, a recommendation to complete the second home improvement project via a hiring a professional; and/or causing, via the one or more processors, the display to display: (i) the recommendation to complete the second home improvement project via hiring the professional in the first portion of the display, and/or (ii) an option to complete the second home improvement project via a DIY technique corresponding to the second home improvement project in the second portion of the display.

In some embodiments, the computer-implemented method further includes: displaying, via the one or more processors, the set of questions; and/or allowing, via the one or more processors, entry of the answers to the set of questions in: (i) a swipe right swipe left format, (ii) a multiple choice format, and/or (iii) a slider bar format.

In some embodiments, the set of questions includes: a question asking if the user has completed a particular project; a question asking if the user is comfortable performing the particular project; and/or a question asking the user is comfortable using a particular tool.

In some embodiments, the computer-implemented method further includes: displaying, via the one or more processors: (i) the DIY score, and/or (ii) the difficulty score of the home improvement project.

In another aspect, a computer device for improved display of a home improvement project for a home may be provided. The computer device may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For example, in one instance, the computer device may include one or more processors configured to: (1) determine a do-it-yourself (DIY) score of a user based upon answers to a set of questions; (2) determine, based upon the DIY score and/or a difficulty score of the home improvement project, a recommendation to complete the home improvement project via a DIY technique; and/or (3) in response to determining the recommendation to complete the home improvement project via the DIY technique, display: (i) the recommendation to complete the home improvement project via the DIY technique in a first portion of a display, wherein the first portion of the display is an upper portion of the display, and/or (ii) an option to complete the home improvement project via a hiring a professional in a second portion of the display, wherein the second portion of the display is a lower portion of the display. The computer device may include additional, less, or alternate functionality, including that discussed elsewhere herein.

In some embodiments, the one or more processors are further configured to: determine a tool to recommend based upon: (i) the home improvement project, and/or (ii) the DIY score; and/or display the recommendation for the tool in the first portion of the display.

In some embodiments, the one or more processors are further configured to: determine a recommendation for a professional to hire based upon the home improvement project; and/or display the recommendation for the professional to hire in the second portion of the display.

In some embodiments, the one or more processors are further configured to: receive a set of tutorials, wherein each tutorial in the set of tutorials has an associated expertise score; determine a tutorial from the set of tutorials based upon the DIY score and/or the expertise scores; and/or display at least part of the determined tutorial.

In some embodiments, the one or more processors are further configured to: receive a tutorial explaining how to complete the home improvement project via the DIY technique; rewrite the tutorial by inputting, into a generative artificial intelligence (AI) algorithm: (i) the tutorial, and/or (ii) the DIY score; and/or display at least part of the rewritten tutorial.

In yet another aspect, a computer system for improved display of a home improvement project for a home may be provided. The computer system may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components. For instance, in one example, the computer system may include: one or more processors; and/or one or more non-transitory memories coupled to the one or more processors. The one or more non-transitory memories may include computer-executable instructions stored therein that, when executed by the one or more processors, may cause the one or more processors to: (1) determine a do-it-yourself (DIY) score of a user based upon answers to a set of questions; (2) determine, based upon the DIY score and/or a difficulty score of the home improvement project, a recommendation to complete the home improvement project via a DIY technique; and/or (3) in response to determining the recommendation to complete the home improvement project via the DIY technique, display: (i) the recommendation to complete the home improvement project via the DIY technique in a first portion of a display, wherein the first portion of the display is an upper portion of the display, and/or (ii) an option to complete the home improvement project via a hiring a professional in a second portion of the display, wherein the second portion of the display is a lower portion of the display. The computer system may include additional, less, or alternate functionality, including that discussed elsewhere herein.

In some embodiments, the one or more non-transitory memories have stored thereon computer-executable instructions that, when executed by the one or more processors, cause the one or more processors to: determine a tool to recommend based upon: (i) the home improvement project, and/or (ii) the DIY score; and/or display the recommendation for the tool in the first portion of the display.

In some embodiments, the one or more non-transitory memories have stored thereon computer-executable instructions that, when executed by the one or more processors, cause the one or more processors to: determine a recommendation for a professional to hire based upon the home improvement project; and/or display the recommendation for the professional to hire in the second portion of the display.

In some embodiments, the one or more non-transitory memories have stored thereon computer-executable instructions that, when executed by the one or more processors, cause the one or more processors to: receive a set of tutorials, wherein each tutorial in the set of tutorials has an associated expertise score; determine a tutorial from the set of tutorials based upon the DIY score and/or the expertise scores; and/or display at least part of the determined tutorial.

In some embodiments, the one or more non-transitory memories have stored thereon computer-executable instructions that, when executed by the one or more processors, cause the one or more processors to: receive a tutorial explaining how to complete the home improvement project via the DIY technique; rewrite the tutorial by inputting, into a generative artificial intelligence (AI) algorithm: (i) the tutorial, and/or (ii) the DIY score; and/or display at least part of the rewritten tutorial.

In some embodiments, the system further: (1) includes the display, and/or the display is comprised in a user device of the user; and/or (2) the computer-executable instructions that, when executed by the one or more processors, further cause the one or more processors to display, on the display: (i) the DIY score, (ii) the difficulty score, and/or (iii) an expertise score of a tutorial associated with the home improvement project.

Additional Exemplary Embodiments—Skill Level Determination and/or Recommendations for DIY Techniques In one aspect, a computer-implemented method for providing recommendations for improving a home based upon a do-it-yourself (DIY) skill level of a user may be provided. The method may be implemented via one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For instance, in one example, the method may include: (1) receiving, via one or more processors, answers to a set of questions; (2) determining, via the one or more processors, a DIY score based upon the answers; (3) receiving, via the one or more processors, a home improvement project for the home and/or a difficulty score of the home improvement project; (4) determining, via the one or more processors, based upon the DIY score and/or the difficulty score of the home improvement project, a recommendation to complete the home improvement project via a DIY technique; and/or (5) causing, via the one or more processors, a display to display the recommendation to complete the home improvement project via the DIY technique. The method may include additional, fewer, or alternate actions, including those discussed elsewhere herein.

In some embodiments, the computer-implemented method further includes: determining, via the one or more processors, based upon the DIY score, a tutorial explaining how to complete the home improvement project via the DIY technique; and/or causing, via the one or more processors, the display to display at least part of the tutorial.

In some embodiments, the computer-implemented method further includes: receiving, via the one or more processors, a set of tutorials, wherein each tutorial in the set of tutorials has an associated expertise score; determining, via the one or more processors, a tutorial from the set of tutorials based upon the DIY score and/or the expertise scores; and/or causing, via the one or more processors, the display to display at least part of the determined tutorial.

In some embodiments, the computer-implemented method further includes: receiving, via the one or more processors, a tutorial explaining how to complete the home improvement project via the DIY technique; rewriting, via the one or more processors, the tutorial by inputting, into a generative artificial intelligence (AI) algorithm: (i) the tutorial, and/or (ii) the DIY score; and/or causing, via the one or more processors, the display to display at least part of the rewritten tutorial.

In some embodiments, the home improvement project is a first home improvement project, and/or the computer-implemented method further includes: receiving, via the one or more processors, a second home improvement project for the home and/or a difficulty score of the second home improvement project; determining, via the one or more processors, based upon the DIY score and/or the difficulty score of the second home improvement project, a recommendation to complete the second home improvement project via a hiring a professional; and/or causing, via the one or more processors, the display to display the recommendation to complete the second home improvement project via hiring the professional.

In some embodiments, the computer-implemented method further includes, prior to the receiving the answers: causing, via the one or more processors, the display to display the set of questions; and/or allowing, via the one or more processors, entry of the answers to the set of questions in: (i) a swipe right swipe left format, (ii) a multiple choice format, and/or (iii) a slider bar format.

In some embodiments, the set of questions includes: a question asking if the user has completed a particular project; a question asking if the user is comfortable performing the particular project; and/or a question asking the user is comfortable using a particular tool.

In some embodiments, the computer-implemented method further includes: receiving, via the one or more processors, an indication that the user has completed the home improvement project via the DIY technique; and/or updating, via the one or more processors, the DIY score based upon the completion of the home improvement project via the DIY technique.

In some embodiments, updating the DIY score includes inputting completion data of the home improvement project into an Artificial Intelligence (AI) algorithm to determine the update.

In another aspect, a computer device for providing recommendations for improving a home based upon a do-it-yourself (DIY) skill level of a user may be provided. The computer device may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For example, in one instance, the computer device may include one or more processors configured to: (1) receive answers to a set of questions; (2) determine a DIY score based upon the answers; (3) receive a home improvement project for the home and/or a difficulty score of the home improvement project; (4) determine, based upon the DIY score and/or the difficulty score of the home improvement project, a recommendation to complete the home improvement project via a DIY technique; and/or (5) cause a display to display the recommendation to complete the home improvement project via the DIY technique. The computer device may include additional, less, or alternate functionality, including that discussed elsewhere herein.

In some embodiments, the one or more processors are further configured to: determine, based upon the DIY score, a tutorial explaining how to complete the home improvement project via the DIY technique; and/or cause, the display to display at least part of the tutorial.

In some embodiments, the one or more processors are further configured to: receive a set of tutorials, wherein each tutorial in the set of tutorials has an associated expertise score; determine a tutorial from the set of tutorials based upon the DIY score and/or the expertise scores; and/or cause the display to display at least part of the determined tutorial.

In some embodiments, the one or more processors are further configured to: receive a tutorial explaining how to complete the home improvement project via the DIY technique; rewrite the tutorial by inputting, into a generative artificial intelligence (AI) algorithm: (i) the tutorial, and (ii) the DIY score; and/or cause the display to display at least part of the rewritten tutorial.

In some embodiments, the home improvement project is a first home improvement project, and/or the one or more processors are further configured to: receive a second home improvement project for the home and/or a difficulty score of the second home improvement project; determine, based upon the DIY score and/or the difficulty score of the second home improvement project, a recommendation to complete the second home improvement project via a hiring a professional; and/or cause the display to display the recommendation to complete the second home improvement project via hiring the professional.

In yet another aspect, a computer system for providing recommendations for improving a home based upon a do-it-yourself (DIY) skill level of a user may be provided. The computer system may include one or more local or remote processors, sensors, transceivers, servers, memory units, augmented reality (AR) glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components. For instance, in one example, the computer system may include: one or more processors; and/or one or more non-transitory memories coupled to the one or more processors. The one or more non-transitory memories may include computer-executable instructions stored therein that, when executed by the one or more processors, may cause the one or more processors to: (1) receive answers to a set of questions; (2) determine a DIY score based upon the answers; (3) receive a home improvement project for the home and/or a difficulty score of the home improvement project; (4) determine, based upon the DIY score and/or the difficulty score of the home improvement project, a recommendation to complete the home improvement project via a DIY technique; and/or (5) cause a display to display the recommendation to complete the home improvement project via the DIY technique. The computer system may include additional, less, or alternate functionality, including that discussed elsewhere herein.

In some embodiments, the one or more non-transitory memories have stored thereon computer-executable instructions that, when executed by the one or more processors, cause the one or more processors to: determine, based upon the DIY score, a tutorial explaining how to complete the home improvement project via the DIY technique; and/or cause, the display to display at least part of the tutorial.

In some embodiments, the one or more non-transitory memories have stored thereon computer-executable instructions that, when executed by the one or more processors, cause the one or more processors to: receive a set of tutorials, wherein each tutorial in the set of tutorials has an associated expertise score; determine a tutorial from the set of tutorials based upon the DIY score and/or the expertise scores; and/or cause the display to display at least part of the determined tutorial.

In some embodiments, the one or more non-transitory memories have stored thereon computer-executable instructions that, when executed by the one or more processors, cause the one or more processors to: receive a tutorial explaining how to complete the home improvement project via the DIY technique; rewrite the tutorial by inputting, into a generative artificial intelligence (AI) algorithm: (i) the tutorial, and/or (ii) the DIY score; and/or cause the display to display at least part of the rewritten tutorial.

In some embodiments, the home improvement project is a first home improvement project, and/or the one or more non-transitory memories have stored thereon computer-executable instructions that, when executed by the one or more processors, cause the one or more processors to: receive a second home improvement project for the home and/or a difficulty score of the second home improvement project; determine, based upon the DIY score and/or the difficulty score of the second home improvement project, a recommendation to complete the second home improvement project via a hiring a professional; and/or cause the display to display the recommendation to complete the second home improvement project via hiring the professional.

In some embodiments, the system further includes the display, and/or: the display is comprised in a user device of the user; and/or the computer-executable instructions that, when executed by the one or more processors, further cause the one or more processors to display, on the display: (i) the DIY score, (ii) the difficulty score, and/or (iii) an expertise score of a tutorial associated with the home improvement project.

OTHER MATTERS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______', is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for providing recommendations for improving a home based upon a do-it-yourself (DIY) skill level of a user, the computer-implemented method comprising:

training, via one or more processors, a reward model using reinforcement learning with human feedback including: (i) providing a prompt to a supervised fine-tuning machine learning model to generate a plurality of output responses, (ii) receiving, from a data labeler, rankings of the plurality of output responses, and (iii) training the reward model based upon the rankings of the plurality of output responses;

receiving, via the one or more processors, answers to a set of questions;

determining, via the one or more processors, a DIY score based upon the answers;

receiving, via the one or more processors, a home improvement project for the home and a difficulty score of the home improvement project;

determining, via the one or more processors, based upon the DIY score and the difficulty score of the home improvement project, a recommendation to complete the home improvement project via a DIY technique;

receiving, via the one or more processors, a tutorial explaining how to complete the home improvement project via the DIY technique;

rewriting, via the one or more processors, according to the trained reward model, the tutorial by inputting, into a generative artificial intelligence (AI) algorithm: (i) the tutorial, and (ii) the DIY score; and causing, via the one or more processors, a display to display: (i) the recommendation to complete the home improvement project via the DIY technique, and (ii) at least part of the rewritten tutorial.

2. The computer-implemented method of claim 1, further including:

receiving, via the one or more processors, a set of tutorials, wherein each tutorial in the set of tutorials has an associated expertise score;

determining, via the one or more processors, a tutorial from the set of tutorials based upon the DIY score and the expertise scores; and causing, via the one or more processors, the display to display at least part of the determined tutorial.

3. The computer-implemented method of claim 1, wherein the home improvement project is a first home improvement project, and the computer-implemented method further includes:

receiving, via the one or more processors, a second home improvement project for the home and a difficulty score of the second home improvement project;

determining, via the one or more processors, based upon the DIY score and the difficulty score of the second home improvement project, a recommendation to complete the second home improvement project via a hiring a professional; and causing, via the one or more processors, the display to display the recommendation to complete the second home improvement project via hiring the professional.

4. The computer-implemented method of claim 1, further including, prior to the receiving the answers:

causing, via the one or more processors, the display to display the set of questions; and allowing, via the one or more processors, entry of the answers to the set of questions in: (i) a swipe right swipe left format, (ii) a multiple choice format, and/or (iii) a slider bar format.

5. The computer-implemented method of claim 1, wherein the set of questions includes:

a question asking if the user has completed a particular project;

a question asking if the user is comfortable performing the particular project; and/or a question asking the user is comfortable using a particular tool.

6. The computer-implemented method of claim 1, further including:

receiving, via the one or more processors, an indication that the user has completed the home improvement project via the DIY technique; and updating, via the one or more processors, the DIY score based upon the completion of the home improvement project via the DIY technique.

7. The computer-implemented method of claim 6, wherein updating the DIY score includes inputting completion data of the home improvement project into an Artificial Intelligence (AI) algorithm to determine the update.

8. A computer device for providing recommendations for improving a home based upon a do-it-yourself (DIY) skill level of a user, the computer device comprising one or more processors configured to:

train a reward model using reinforcement learning with human feedback by: (i) providing a prompt to a supervised fine-tuning machine learning model to generate a plurality of output responses, (ii) receiving, from a data labeler, rankings of the plurality of output responses, and (iii) training the reward model based upon the rankings of the plurality of output responses;

receive answers to a set of questions;

determine a DIY score based upon the answers;

receive a home improvement project for the home and a difficulty score of the home improvement project;

determine, based upon the DIY score and the difficulty score of the home improvement project, a recommendation to complete the home improvement project via a DIY technique;

receive a tutorial explaining how to complete the home improvement project via the DIY technique;

rewrite, according to the trained reward model, the tutorial by inputting, into a generative artificial intelligence (AI) algorithm: (i) the tutorial, and (ii) the DIY score; and cause a display to display: (i) the recommendation to complete the home improvement project via the DIY technique, and (ii) at least part of the rewritten tutorial.

9. The computer device of claim 8, wherein the one or more processors are further configured to:

receive a set of tutorials, wherein each tutorial in the set of tutorials has an associated expertise score;

determine a tutorial from the set of tutorials based upon the DIY score and the expertise scores; and cause the display to display at least part of the determined tutorial.

10. The computer device of claim 8, wherein the home improvement project is a first home improvement project, and the one or more processors are further configured to:

receive a second home improvement project for the home and a difficulty score of the second home improvement project;

determine, based upon the DIY score and the difficulty score of the second home improvement project, a recommendation to complete the second home improvement project via a hiring a professional; and cause the display to display the recommendation to complete the second home improvement project via hiring the professional.

11. A computer system for providing recommendations for improving a home based upon a do-it-yourself (DIY) skill level of a user, the computer system comprising:

one or more processors; and one or more non-transitory memories, the one or more non-transitory memories having stored thereon computer-executable instructions that, when executed by the one or more processors, cause the one or more processors to:

train a reward model using reinforcement learning with human feedback by:

(i) providing a prompt to a supervised fine-tuning machine learning model to generate a plurality of output responses, (ii) receiving, from a data labeler, rankings of the plurality of output responses, and (iii) training the reward model based upon the rankings of the plurality of output responses;

receive answers to a set of questions;

determine a DIY score based upon the answers;

receive a home improvement project for the home and a difficulty score of the home improvement project;

determine, based upon the DIY score and the difficulty score of the home improvement project, a recommendation to complete the home improvement project via a DIY technique;

receive a tutorial explaining how to complete the home improvement project via the DIY technique;

rewrite, according to the trained reward model, the tutorial by inputting, into a generative artificial intelligence (AI) algorithm: (i) the tutorial, and (ii) the DIY score; and cause a display to display: (i) the recommendation to complete the home improvement project via the DIY technique, and (ii) at least part of the rewritten tutorial.

12. The computer system of claim 11, the one or more non-transitory memories having stored thereon computer-executable instructions that, when executed by the one or more processors, cause the one or more processors to:

receive a set of tutorials, wherein each tutorial in the set of tutorials has an associated expertise score;

determine a tutorial from the set of tutorials based upon the DIY score and the expertise scores; and cause the display to display at least part of the determined tutorial.

13. The computer system of claim 11, wherein the home improvement project is a first home improvement project, and wherein the one or more non-transitory memories have stored thereon computer-executable instructions that, when executed by the one or more processors, cause the one or more processors to:

receive a second home improvement project for the home and a difficulty score of the second home improvement project;

determine, based upon the DIY score and the difficulty score of the second home improvement project, a recommendation to complete the second home improvement project via a hiring a professional; and cause the display to display the recommendation to complete the second home improvement project via hiring the professional.

14. The computer system of claim 11, further comprising the display, wherein:

the display is comprised in a user device of the user; and the computer-executable instructions that, when executed by the one or more processors, further cause the one or more processors to display, on the display: (i) the DIY score, (ii) the difficulty score, and (iii) an expertise score of a tutorial associated with the home improvement project.

* * * * *